(12) United States Patent
Brown

(10) Patent No.: US 6,591,671 B2
(45) Date of Patent: Jul. 15, 2003

(54) MONITORING PNEUMATIC TIRE CONDITIONS

(75) Inventor: Robert Walter Brown, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/771,539

(22) Filed: Jan. 29, 2001

(65) Prior Publication Data

US 2001/0008083 A1 Jul. 19, 2001

Related U.S. Application Data

(63) Continuation-in-part of application No. PCT/US99/18610, filed on Aug. 16, 1999.

(51) Int. Cl.[7] .............................................. G01M 17/02
(52) U.S. Cl. ...................... 73/146.5; 73/146; 340/442; 340/445
(58) Field of Search ............................... 73/146, 146.2, 73/146.3, 146.4, 146.5, 146.8; 455/336; 340/442, 447, 445

(56) References Cited

U.S. PATENT DOCUMENTS

| 3,225,810 A | 12/1965 | Enabnit |
| 3,588,814 A | 6/1971 | Furlong |
| 3,619,678 A | 11/1971 | Ruof |
| 3,665,387 A | 5/1972 | Enabnit |
| 3,831,161 A | 8/1974 | Enabnit |
| 3,831,570 A | 8/1974 | Compton et al. |
| 3,832,640 A | 8/1974 | Cederquist et al. |
| 3,835,451 A | 9/1974 | Church |
| 3,872,424 A | 3/1975 | Enabnit |
| 4,052,696 A | 10/1977 | Enabnit |
| 4,067,235 A | 1/1978 | Markland et al. |

(List continued on next page.)

FOREIGN PATENT DOCUMENTS

| BR | PI 9603529-3 | 5/1998 |
| FR | 2785852 | 5/2000 |
| WO | WO99/52722 | 10/1999 |

Primary Examiner—Edward Lefkowitz
Assistant Examiner—Andre Allen
(74) Attorney, Agent, or Firm—Howard M. Cohn

(57) ABSTRACT

At least one dynamic condition of a pneumatic tire of a vehicle is determined by measuring the rotational angular position of the tire and/or a wheel or wheel carrier the tire is mounted on. The position measurement is preferably combined with transponder measurements of tire pressure and/or temperature, and the measurement information is transmitted from a tire or wheel antenna to a receiver with one or more antennas on the vehicle. The measurements can be combined with a tire pressure regulating device. The rotational angular position is preferably measured by monitoring fluctuations in coupling of RF power between the transmitting and the receiving antennas. In a preferred embodiment, transponders and antennas are disposed in both the tire and the wheel or wheel carrier for the purpose of monitoring the rotational angular position of a tire relative to its wheel or wheel carrier, thereby indicating torsional effects on the tire. Preferably, the tire antenna in the preferred embodiment is mounted inside the tire near the outer circumference of the tire.

18 Claims, 16 Drawing Sheets

U.S. PATENT DOCUMENTS

| | | |
|---|---|---|
| 4,099,157 A | 7/1978 | Enabnit |
| 4,119,944 A | 10/1978 | Smith |
| 4,319,220 A | 3/1982 | Pappas et al. |
| 4,609,905 A | 9/1986 | Uzzo |
| 4,703,650 A | 11/1987 | Dosjoub et al. |
| 4,724,427 A | 2/1988 | Carroll |
| 4,730,188 A | 3/1988 | Milheiser |
| 4,742,857 A | 5/1988 | Gandhi |
| 4,755,345 A | 7/1988 | Baity, Jr. et al. |
| 4,842,486 A | 6/1989 | Neubauer |
| 4,911,217 A | 3/1990 | Dunn et al. |
| 5,029,468 A | 7/1991 | Dosjoub |
| 5,050,110 A | 9/1991 | Rott |
| 5,095,309 A | 3/1992 | Troyk et al. |
| 5,181,975 A | 1/1993 | Pollack et al. |
| 5,201,968 A | 4/1993 | Renier |
| 5,218,343 A | 6/1993 | Stobbe et al. |
| 5,218,862 A | 6/1993 | Hurrell, II et al. |
| 5,235,236 A | 8/1993 | Nakahata et al. |
| 5,274,355 A | 12/1993 | Galan |
| 5,319,354 A | 6/1994 | Myatt |
| 5,339,073 A | 8/1994 | Dodd et al. |
| 5,345,217 A | 9/1994 | Prottey |
| 5,409,049 A | 4/1995 | Renier |
| 5,413,159 A | 5/1995 | Olney et al. |
| 5,505,080 A | 4/1996 | McGhee |
| 5,509,455 A | 4/1996 | Warchol et al. |
| 5,524,034 A | 6/1996 | Srygley et al. |
| 5,537,867 A | 7/1996 | Koska et al. |
| 5,559,484 A * | 9/1996 | Nowicki et al. ............ 340/447 |
| 5,559,507 A | 9/1996 | Beigel |
| 5,569,848 A | 10/1996 | Sharp |
| 5,581,023 A * | 12/1996 | Handfield et al. ......... 73/146.5 |
| 5,585,554 A * | 12/1996 | Handfield et al. ......... 73/146.5 |
| 5,594,448 A | 1/1997 | d'Hont |
| 5,612,671 A | 3/1997 | Mendez et al. |
| 5,667,606 A | 9/1997 | Renier |
| 5,694,111 A | 12/1997 | Huang |
| 5,708,411 A | 1/1998 | Hill |
| 5,721,528 A | 2/1998 | Boesch et al. |
| 5,731,516 A * | 3/1998 | Handfield et al. ......... 73/146.5 |
| 5,731,754 A | 3/1998 | Lee, Jr. et al. |
| 5,749,984 A | 5/1998 | Frey et al. |
| 5,790,016 A | 8/1998 | Konchin et al. |
| 5,824,891 A | 10/1998 | Monson |
| 5,826,207 A | 10/1998 | Ohashi et al. |
| 5,851,056 A | 12/1998 | Hyde |
| 5,936,155 A | 8/1999 | Francois et al. |
| 5,969,239 A | 10/1999 | Tromeur et al. |
| 6,026,338 A | 2/2000 | Borschert et al. |
| 6,026,339 A | 2/2000 | Williams |
| 6,035,913 A | 3/2000 | Bapt et al. |
| 6,036,199 A | 3/2000 | Oshida et al. |
| 6,041,887 A | 3/2000 | Kojo et al. |
| 6,044,939 A | 4/2000 | Forster |
| 6,060,984 A | 5/2000 | Braun et al. |
| 6,092,028 A | 7/2000 | Naito et al. |
| 6,094,978 A | 8/2000 | Battocchio et al. |
| 6,101,870 A | 8/2000 | Kato et al. |
| 6,105,420 A | 8/2000 | Kimura |
| 6,113,119 A | 9/2000 | Laurent et al. |
| 6,435,020 B1 * | 8/2002 | Oldenettel et al. ......... 73/146.4 |

* cited by examiner

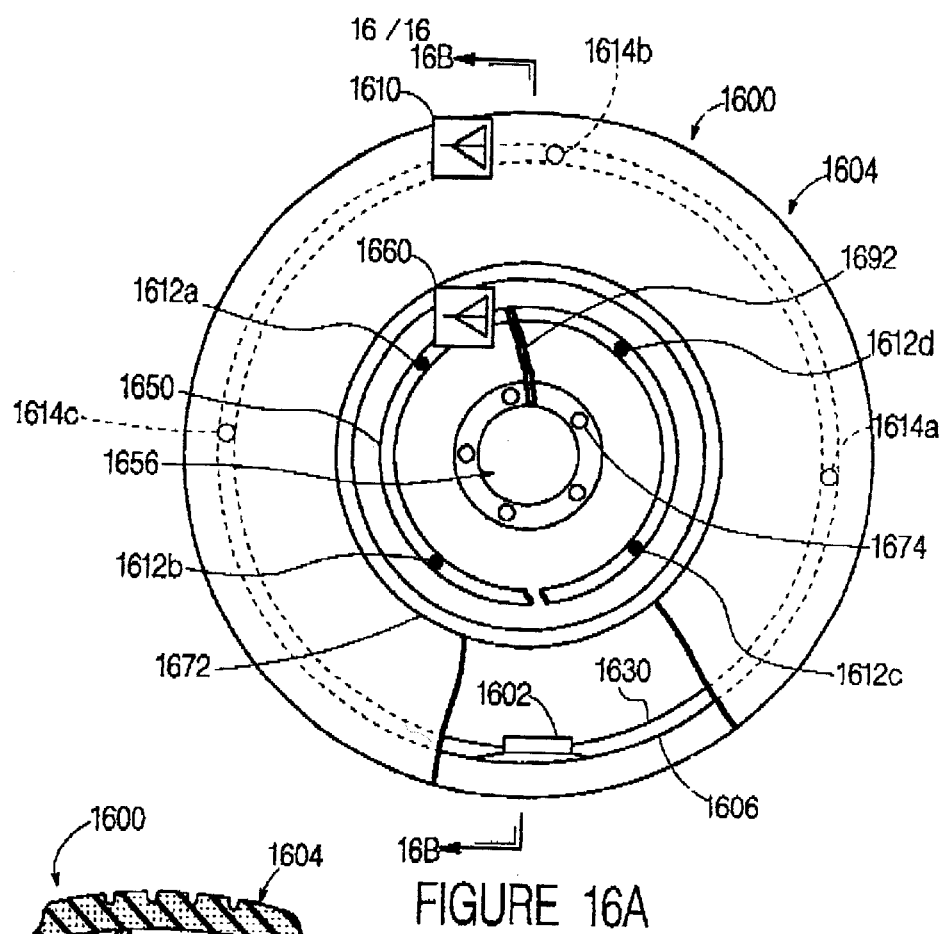
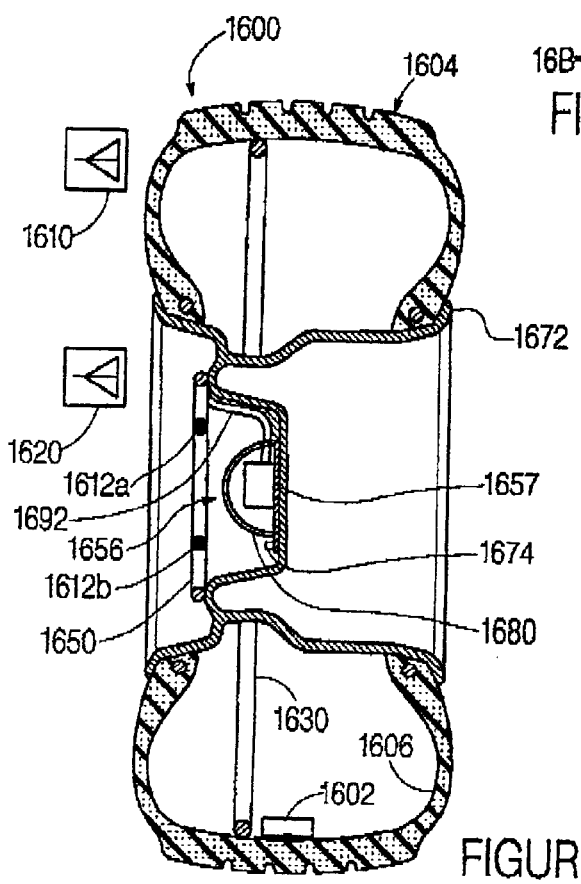
FIGURE 16A
FIGURE 16B

MONITORING PNEUMATIC TIRE CONDITIONS

CROSS-REFERENCE TO RELATED APPLICATIONS

This application is a continuation-in-part of PCT Application Ser. No. PCT/US99/18610 entitled MONITORING A DYNAMIC CONDITION OF A ROTARY ELEMENT, PARTICULARLY A PNEUMATIC TIRE having a common inventor and a filing date of Aug. 16, 1999.

TECHNICAL FIELD OF THE INVENTION

The present invention relates to a system for and a method of measuring a dynamic condition of a pneumatic tire and, more particularly to a system for and a method of determining at least one dynamic condition of a pneumatic tire by measuring the rotational angular position of the tire and/or a wheel or wheel carrier the tire is mounted on.

BACKGROUND OF THE INVENTION

The present invention relates to monitoring of conditions of any rotary element, but is particularly concerned with the monitoring of conditions of wheels and pneumatic tires mounted on wheels. As a rotary element, a tire's angular position, rotational (angular) velocity and acceleration, rate of change of acceleration, and revolution count are important in determining such things as vehicle and/or tire instantaneous position, speed, mileage, acceleration and braking, slip/skid, and are also factors in the wear of the tire. Certain of these elements are utilized in control of vehicle braking systems, such as automotive and aircraft ABS systems (anti-lock braking system). Existing monitoring systems generally assume the approximation that the tire/wheel assembly is rigid in the tangential direction (tangential to the direction of rotation, e.g., forward or backward relative to a rolling tire). The present invention moves beyond this rigid approximation in order to monitor other wheel and/or tire operating characteristics, such as for example, torque on the tire.

In addition to rotational/angular characteristics, other important characteristics to be monitored in a pneumatic tire are pneumatic pressure and temperature. Pressure (pneumatic pressure) is well known as a critical factor in pneumatic tire operation, most importantly if there is a loss of sufficient pressure to safely operate the tire, e.g., a "flat tire". The (pneumatic) temperature is generally of secondary importance. Although it can be used to indicate an average temperature of the tire and wheel surrounding the pneumatic cavity, temperature is mostly used to normalize a pressure measured in a hot tire to a "cold pressure" value, i.e., the pressure as it would be in a "cold" tire.

A great deal of prior art is devoted to apparatus and methods for measuring and monitoring rotary element and pneumatic conditions, particularly as they relate to pneumatic tire conditions.

THE ASSIGNEE'S ONGOING DEVELOPMENT EFFORTS

For a century, the Goodyear Tire & Rubber Company of Akron Ohio, assignee of the present invention, has been the uncontested industry leader in tire product technology. For example, as early as 1892, a puncture-resistant tire was patented. In 1934, a year recognized as the beginning of the run-flat era, Goodyear introduced the Lifeguard (tm) safety tube, a fabric tube within the tire, used commercially by automakers and on trucks. In 1993, Goodyear's Eagle GS-C EMT (Extended Mobility Technology) Tire won the Discover Award for Automotive Technological Innovation. In 1996, the Goodyear Eagle F1 run-flat tire was chosen as standard equipment on the 1997 Chevrolet C-5 Corvette.

Other examples of the strides Goodyear has taken in the advancement of tire and related technologies include, but are not limited to, the following patented inventions:

Commonly-owned U.S. Pat. No. 3,665,387 (Enabnit; 1972), entitled SIGNALLING SYSTEM FOR LOW TIRE CONDITION ON A VEHICLE, incorporated in its entirety by reference herein, discloses a low tire pressure warning system adaptable for any number of wheels of a vehicle and providing dashboard indications of system operation and low pressure conditions while the vehicle is in motion.

Commonly-owned U.S. Pat. No. 3,831,161 (Enabnit; 1974), entitled FAIL-SAFE MONITORING APPARATUS, incorporated in its entirety by reference herein, discloses monitoring vehicle tire pressure wherein the operator is warned of an abnormal or unsafe condition of one or more of the tires.

Commonly-owned U.S. Pat. No. 3,872,424 (Enabnit; 1975), entitled APPARATUS AND METHOD FOR TRANSMITTING AUXILIARY SIGNALS ON EXISTING VEHICLE WIRING, incorporated in its entirety by reference herein, discloses communicating with low tire pressure monitoring circuits using power pulses carried on existing vehicle wiring (e.g., the turn signal circuits).

Commonly-owned U.S. Pat. No. 4,052,696 (Enabnit; 1977), entitled TIRE CONDITION MONITOR, incorporated in its entirety by reference herein, discloses a tire condition sensing circuit that includes a ferrite element that changes from a ferromagnetic to a non-ferromagnetic state in response to a temperature increase above the material Curie point.

Commonly-owned U.S. Pat. No. 4,099,157 (Enabnit; 1978), entitled SINGLE WIRE POWER/SIGNAL SYSTEM FOR VEHICLE AUXILIARY DEVICES, incorporated in its entirety by reference herein, discloses providing both power to and receiving detection signals from a remotely located condition monitoring device using a single wire with ground return through the vehicle frame.

Commonly-owned U.S. Pat. No. 4,911,217 (Dunn, et. al.; 1990), entitled INTEGRATED CIRCUIT TRANSPONDER IN A PNEUMATIC TIRE FOR TIRE IDENTIFICATION, incorporated in its entirety by reference herein, discloses an RF transponder in a pneumatic tire. FIG. 1a of this patent illustrates a prior-art identification system ("reader") that can be used to interrogate and power the transponder within the tire. The identification system includes a portable hand-held module having within it an exciter and associated circuitry for indicating to a user the numerical identification of the tire/transponder in response to an interrogation signal.

Commonly-owned U.S. Pat. No. 5,181,975 (Pollack, et. al.; 1993), entitled INTEGRATED CIRCUIT TRANSPONDER WITH COIL ANTENNA IN A PNEUMATIC TIRE FOR USE IN TIRE IDENTIFICATION, incorporated in its entirety by reference herein, discloses a pneumatic tire having an integrated circuit (IC) transponder and pressure transducer. As described in this patent, in a tire that has already been manufactured, the transponder may be attached to an inner surface of the tire by means of a tire patch or other similar material or device.

Commonly-owned U.S. Pat. No. 5,218,861 (Brown, et al.; 1993), entitled PNEUMATIC TIRE HAVING AN INTEGRATED CIRCUIT TRANSPONDER AND PRESSURE TRANSDUCER, incorporated in its entirety by reference herein, discloses a pneumatic tire having an integrated circuit (IC) transponder and pressure transducer mounted within the pneumatic tire. Upon interrogation (polling) by an external RF signal provided by a "reader", the transponder transmits tire identification and tire pressure data in digitally-coded form. The transponder is "passive" in that it is not self-powered, but rather obtains its operating power from the externally-provided RF signal.

The commonly-owned U.S. Patents referenced immediately hereinabove are indicative of the long-standing, far-reaching and ongoing efforts being made by the Goodyear Tire & Rubber Company in advancing tire product technology, particularly in the area of monitoring tire operating conditions.

Dynamic Conditions

Dynamic conditions such as position and angular velocity of a rotary element are readily measured.

U.S. Pat. No. 3,831,570, incorporated in its entirety by reference herein, discloses measuring a crankshaft's rotary position using a magnetic pickup coil, a rotating toothed wheel, and a permanent magnet. The toothed wheel has a number of teeth corresponding to the number of spark plugs.

U.S. Pat. No. 3,832,640, incorporated in its entirety by reference herein, discloses determining a large number of angular relationships (rotary positions) in a rotating element such as a crankshaft.

Straightforward tire revolution counters are well known, and are disclosed for example in U.S. Pat. Nos. 4,842,486 and 5,524,034, both of which are incorporated in their entirety by reference herein.

U.S. Pat. No. 5,218,862, incorporated in its entirety by reference herein, discloses a tire pressure monitor comprising wheel speed sensors located at the vehicle's wheels to convey wheel speed information to an electronic controller. This patent notes that the wheel speed discrepancy between one tire to the others indicates the relative tire pressure, but that discrepancy may also be indicative of the vehicle turning, accelerating or decelerating, going up or down steep grades, or of one wheel slipping, or of a cross wind bearing on the vehicle.

U.S. Pat. No. 5,274,355, incorporated in its entirety by reference herein, discloses a system for monitoring pressure and temperature of rotating pneumatic tires. An elastic diaphragm is embedded in or bonded to the sidewall of the tire. Tire pressure changes cause measurable expansion and contraction of the diaphragm surface. The diaphragm comprises a pair of reflective stripes spaced apart from one another at a fixed distance to define a reference dimension, and another pair of reflective stripes which move relative to one another as the diaphragm expands or contracts in relation to the tire inflation pressure. The time interval between pulses associated with the reflective stripes, as sensed by photodetectors affixed to the vehicle indicates individual tire speed. The background infrared radiation naturally emitted from the tire indicates tire temperature.

U.S. Pat. No. 5,345,217, incorporated in its entirety by reference herein, discloses measuring wheel speed of a motor vehicle with a multi-tooth pulse generator on each wheel (as is used on electronic Anti-Lock Braking Systems) to produce a series of pulses spaced apart by equal increments of angular rotation of each wheel. The speed of each wheel is compared to the others, to determine if, and to what extent, a tire is deflated.

U.S. Pat. No. 5,569,848, incorporated in its entirety by reference herein, discloses a system for monitoring tire pressure, comprising toothed ring sensors affixed to each wheel assembly, a sensor operatively associated with each respective toothed ring and producing signals that are a measure of the rotational velocity of the wheels, and a computer receiving signals from the sensors. The computer monitors the wheel speed sensors during vehicle operation, calculating and indicating vehicle speed, distance traveled by the vehicle and low tire pressure.

U.S. Pat. No. 5,721,528, incorporated in its entirety by reference herein, discloses a low tire pressure warning system utilizing angular displacement sensors at each wheel. The system utilizes wheel displacement sensors already in place on vehicles that include ABS systems. Certain vehicle operating conditions, such as excessive or very low speeds, braking, and turns, are determined from the sensor outputs.

U.S. Pat. No. 3,588,814, incorporated in its entirety by reference herein, discloses an electric tire inflation indicator which determines the inflated condition of a tire by monitoring the rotational travel speed of the tire's respective wheel, by means of a stationary reed switch and a magnet rotating with the wheel.

U.S. Pat. No. 5,749,984, incorporated in its entirety by reference herein, discloses a tire monitoring system and method utilizing a sensor in the tire to detect tire sidewall deflection and thereby determine tire pressure, tire speed and the number of tire revolutions.

Static Conditions

In addition to the aforementioned dynamic conditions (e.g., position, rotational velocity and acceleration), static conditions are also associated with rotating elements such as pneumatic tires—for example, pressure and temperature. Failure to correct quickly for improper tire pressure may result in excessive tire wear, blowouts, poor gasoline mileage and steering difficulties. An automatic tire deflation warning system is especially critical for "run flat" tires, where the deflated condition is barely detectable by the driver himself. Sensors for static parameters are typically located within the rotating tire, and associated circuitry can transmit data indicative of a sensed condition to an on-board receiver within the vehicle.

Transponder Systems for Pneumatic Tires

A "transponder" is an electronic device capable of both receiving and transmitting radio frequency (RF) signals. Transponder systems, typically including a plurality of transponders and a single interrogator are well known and disclosed, for example, in U.S. Pat. No. 5,339,073, incorporated in its entirety by reference herein.

It is known to put transponders (and associated sensors) in pneumatic tires of motor vehicles. These transponders transmit a RF wave, with or without variable data (e.g., tire pressure, temperature, position) and/or fixed data (e.g., tire ID) to outside the tire, and receive RF signals, with or without data, from outside the tire. A separate transponder is typically associated with each tire of a motor vehicle to monitor and transmit tire-related data. Typically, an "interrogator" having both transmitting and receiving capabilities is used to communicate with the transponders. The interrogator may be "hand-held", or mounted "on-board" the vehicle, or positioned along or in a roadway (e.g., "drive-over", or "drive by ").

"Active" transponders have their own power supply (e.g., a battery). They transmit signals, and are typically also capable of receiving signals to control their functionality.

"Passive" transponders are powered by the energy of an incoming RF signal, such as from an interrogator. Passive transponders fall into two general categories, those having only passive circuitry, and those having some active circuitry. In the main, transponders which are passive transponders having some active circuitry are discussed herein.

U.S. Pat. No. 5,612,671, incorporated in its entirety by reference herein, discloses a low tire pressure warning system having a pressure sensor and radio transmitter in each wheel, and a vehicle-mounted receiver including a microprocessor.

U.S. Pat. No. 4,609,905, incorporated in its entirety by reference herein, discloses a passive transponder having only passive circuitry. An RF transmitter in the vehicle interrogates the transponder, which reflects a predetermined harmonic of the RF signal back to a receiver as a function of the state of an associated pressure switch.

U.S. Pat. No. 4,067,235, incorporated in its entirety by reference herein, discloses a passive transponder with a tire pressure sensor. Electromagnetic radiation generated by a power transmitter is received by a receiving antenna comprising an inductor and a capacitor in the tire pressure sensor. This radiation is converted by a rectifier-filter to electricity to power active components (oscillator, buffer amplifier, transmitter) of the transponder.

U.S. Pat. No. 4,724,427, incorporated in its entirety by reference herein, discloses a passive transponder that receives a carrier signal from an interrogator. The carrier signal is rectified by a rectifying circuit connected across the transponder's antenna coil to generate electricity to power the transponder. Data is encoded and mixed with the carrier signal in a balanced modulator circuit. The output of the balanced modulator circuit is transmitted back to the interrogator unit.

U.S. Pat. No. 4,703,650, incorporated in its entirety by reference herein, discloses a circuit suitable for one of many methods of coding for transmission the values of variables measured in a tire, and a device for monitoring tires employing such a circuit. An astable multivibrator transforms the measurement of the variable in question, for instance pressure and temperature, into a time measurement. The astable multivibrator delivers a pulse signal whose pulse width is a function of the temperature and the cyclic ratio of which is a function of the pressure. The signal is suitably transmitted from the tire to the vehicle by, for example, inductive coupling.

U.S. Pat. No. 4,730,188, incorporated in its entirety by reference herein, discloses a passive transponder excited by an inductive coupling from an interrogator. The transponder responds to the interrogator via the inductive coupling with a signal constituting a stream of data. The transponder comprises an induction coil serving as its antenna, and a full wave rectifier bridge and smoothing capacitor connected across the antenna to provide DC voltage (power) to active circuitry within the transponder.

U.S. Pat. No. 5,969,239, incorporated in its entirety by reference herein, discloses some forms of antennas for electromagnetically coupling moving transponders in tires to stationary antennas on the vehicle. The patent concerns replacing an annular coil type of rotating antenna with a smaller antenna integrated with the measurement sensor (transponder) in one small box firmly attached to the wheel, plus a closed circular strip-iron coupling ring attached to and coaxial with the wheel. The rotating antenna, stationary antenna and coupling ring are positioned so that electric current is induced in the coupling ring by magnetic flow in either of the antennas and vice versa. Alternate embodiments are mentioned which consider using the "metallic environment" in place of the ring of strip iron, for example the wheel itself, or at least one of the metallic beads of the tire. The frequency of transmission is from 30 to 100 kilohertz.

U.S. Pat. No. 5,824,891, incorporated in its entirety by reference herein, discloses "a transmitting circuit . . . mounted on a frame member. The transmitting circuit includes a transmitting coil and generates electrical energy . . . ." A "receiving is inductively coupled to the transmitting circuit. The receiving circuit includes a sensor for generating a data corresponding to a physical characteristic of the vehicle wheel and a wireless communication circuit for receiving the electrical energy from the transmitting coil to remotely power the receiving circuit and for transferring the data signal from the receiving circuit to the transmitting circuit".

U.S. Pat. No. 4,911,217, incorporated in its entirety by reference herein, discloses an RF transponder in a pneumatic tire. FIG. 1a illustrates a prior-art identification system ("reader") that can be used to interrogate and power the transponder within the tire. A portable hand-held module has within it an exciter and circuitry for indicating the numerical identification of the tire/transponder.

U.S. Pat. Nos. 5,181,975 and 5,218,861, incorporated in their entirety by reference herein, disclose a pneumatic tire having an integrated circuit passive transponder located within the structure of the tire for use in tire identification and pressure data transmission. The interrogation signal is rectified by circuitry in the transponder, which then utilizes the rectified signal as its source of electrical power for use in its transmission of digitally encoded signals.

U.S. Pat. No. 4,220,907, incorporated in its entirety by reference herein, discloses a low tire pressure alarm system for vehicles. Each wheel is provided with a transmitter, and there is a common receiver comprising a suitable antenna such as a ferrite loopstick.

U.S. Pat. No. 4,319,220, incorporated in its entirety by reference herein, discloses a system for monitoring tire pressure, comprising wheel units in the tires and a common receiver. Each wheel unit has an antenna comprising a continuous wire loop disposed against the inner periphery of the tire for transmitting signals and for receiving power. Multiple antennas may be provided for the receiver, and may be in the form of ferrite loopsticks.

U.S. Pat. No. 5,319,354, incorporated in its entirety by reference herein, discloses an antenna structure for communicating with an electronic tag (transponder) implanted in a pneumatic tire. This patent recognizes that the orientation of the transponder with respect to the antenna communicating with the transponder can adversely affect coupling between the interrogation antenna and the transponder antenna. A construction of an interrogation antenna is described so that, regardless of the position of the transponder in the pneumatic tire, a position of which is unknown, the coupling is always of the same quality.

The following U.S. Pat. Nos. are also cited as being of interest: 3,835,451, 4,755,345, 5,095,309, 5,235,326, 5,537,867, 5,559,507, 5,594,448, 5,731,754, 5,790,016, 5,790,016, 5,824,891, and 5,826,207, all of which are incorporated in their entirety by reference herein.

International Publication No. WO 99/52722 (Oct. 21, 1999), incorporated in its entirety by reference herein, discloses a method and apparatus for sensing tire pressure in a vehicle wheel which is wireless. It employs "known" pressure and temperature sensors, "known" revolution detectors (e.g., ABS), and "known" controllers. A transducer, the sensors, a power source (e.g., battery), and a transmitter are mounted on the wheel rim, interior to the tire. The transducer measures a pneumatic pressure and/or temperature and/or wheel speed that is converted into a wireless data signal by the transmitter. A receiver coil [antenna] is connected to a portion of the vehicle, such as a wheel well member, preferably within three tenths of a meter of the transducer/transmitter coil. Another coil connected to the vehicle may be tuned to receive wheel speed signals from the "known type" of wheel speed sensor, and these signals are conditioned by the receiver and passed to the controller along with the pressure and temperature signal. The pressure/temperature signal and the wheel speed signal may be distinguished by various known means such as by frequency or modulation design, or a separate receiver can be utilized.

Tire Pressure Regulation

In addition to sensing, if not measuring/monitoring, pneumatic tire pressure, a variety of systems have been developed to regulate, adjust and/or replenish the pneumatic medium (air) in a tire.

U.S. Pat. No. 5,505,080, incorporated in its entirety by reference herein, discloses a tire pressure management system including a tire condition monitor connected to the tire so as to be interactive with air pressure in the tire for selectively measuring a pressure in the tire, a controller, and a display. The tire condition monitor includes a transmitter and a receiver. The controller also has a transmitter and a receiver connected thereto, and the condition monitor and controller communicate via radio signals. An air compressor is mounted to a wheel of the tire so as to deliver air to an interior of the tire when the pressure of the tire is below a predetermined value. A power generator is connected to the wheel of the tire and includes an alternator magnet assembly and an induction coil assembly which are connected to the wheel of the tire such that relative rotation occurs therebetween as the tire rotates. FIG. 7 illustrates a tire pressure sensor, a temperature sensor, and a pick-up coil for revolution counting, all connected to the microprocessor chip of the condition monitor. The revolution counter is said to be usable "in place of [a] hubometer."

U.S. Pat. No. 5,667,606, (referred to hereinbelow as the "Renier/Cycloid '606 Patent") incorporated in its entirety by reference herein, discloses a tire pressurizing and regulating apparatus comprising a displacement type air pump axially mounted on a vehicle wheel with an air pressure connection conduit introducing air under pressure generated from the pump into the pneumatic tire. A conventional [mechanical] pressure level mechanism is also provided and connected to the pump for establishing and maintaining a desired air pressure in the tire at a predetermined level. A cam and cam follower arrangement is mounted in the housing for the pump, and a pendulum is mounted for free axial rotation relative to the pump housing. The pendulum is connected to one of the cam or cam follower, and the other is secured to the pump housing for rotation therewith to provide a cam actuated driving movement for the pump.

U.S. Pat. No. 4,742,857, incorporated in its entirety by reference herein, discloses a tire pressure sensor and air supply to maintain desired tire pressure. The disclosed system for detecting the air pressure in each wheel (by means of a moveable magnet pressure sensor) and for effecting inflation or deflation in each wheel (by means of a valve connected to the moveable magnet) while the vehicle is operating, includes a controller and a high pressure reservoir mounted on each wheel. A data processor displays the tire pressure to the vehicle operator and allows for manual actuation of the valve for raising or lowering of the tire pressure.

U.S. Pat. No. 5,413,159, incorporated in its entirety by reference herein, discloses a self regulating tire pressure system and method which employs a bistable valve that allows air from a high pressure reservoir (mounted on the wheel) to replenish the pressure within a tire when it has fallen below an actuating pressure, and discontinues its operation only after the tire pressure has increased to a closing pressure that is greater than the actuating pressure. The system is capable of sensing the frequency, number and duration of the valve's operations as indications of a slow tire leak, a flat, or a low reservoir pressure condition, respectively.

In a variation that does not require an air pressure supply mounted on the tire, Brazilian Patent No. PI 9603529-3A, incorporated in its entirety by reference herein, discloses a system with one or more minicompressors with pressure sensors mounted in the vehicle and coupled to the tires by means of rotating air couplings.

BRIEF SUMMARY OF THE INVENTION

According to an aspect of the invention, a system for monitoring pneumatic tire conditions for one or more tire/wheel assemblies mounted on a vehicle, each tire/wheel assembly comprising a tire mounted on a wheel or wheel carrier, is characterized by: a wheel or wheel carrier transponder with a wheel or wheel carrier antenna mounted on the wheel or wheel carrier of the one or more tire/wheel assemblies for transmitting a signal indicating the rotational angular position of the wheel or wheel carrier; one or more receivers each having one or more receiving antennas fixedly mounted on the vehicle, the one or more receiving antennas being positioned to receive the signal from a specific one of the tire/wheel assemblies; and circuitry for processing the signals received by the one or more receiving antennas to determine the rotational angular position of the wheel or wheel carrier of the one or more tire/wheel assemblies.

According to an aspect of the invention, at least one of the wheel or wheel carrier antennas is substantially circular and includes a plurality of reactive circuit affecting elements incorporated into and spaced about the circumference of the at least one wheel or wheel carrier antenna for causing blips which are indicative of the rotational angular position of the wheel or wheel carrier antenna to occur in the signal received by the receiving antenna which is positioned to receive the signal from the at least one wheel or wheel carrier antenna.

According to an aspect of the invention, at least one of the wheel or wheel carrier antennas is a conductive hoop coupled to the wheel or wheel carrier transponder; and each conductive hoop wheel or wheel carrier antenna includes a plurality of reactive circuit affecting elements incorporated into and spaced about the circumference of the conductive hoop wheel or wheel carrier antenna for causing blips which are indicative of the rotational angular position of the conductive hoop wheel or wheel carrier antenna to occur in the signal received by the receiving antenna which is positioned to receive the signal from the at least one wheel or wheel carrier antenna.

According to an aspect of the invention, a method for monitoring pneumatic tire conditions for one or more tire/wheel assemblies each comprising a tire mounted on a wheel or wheel carrier, is characterized by the step of comparing the rotational angular position of a tire to the rotational angular position of the wheel or wheel carrier in the tire's tire/wheel assembly in order to determine operating conditions of the tire.

According to an aspect of the invention, the method can include further determining pneumatic tire conditions by monitoring one or more of a tire pressure, a tire temperature, and a count of tire revolutions.

According to an aspect of the invention, the method can include measuring the rotational angular position of a radially outer portion of the tire by means of an RF signal transmitted by an antenna mounted inside the tire near the outer circumference of the tire.

According to another aspect of the invention, a system for monitoring pneumatic tire conditions for one or more tire/wheel assemblies mounted on a vehicle, each tire/wheel assembly comprising a tire mounted on a wheel or wheel carrier, is characterized by: a wheel or wheel carrier transponder with a wheel or wheel carrier antenna mounted on the wheel or wheel carrier of the one or more tire/wheel assemblies for transmitting a first signal indicating the rotational angular position of the wheel or wheel carrier; a tire transponder with a tire antenna mounted on the tire of the one or more tire/wheel assemblies for transmitting a second signal indicating the rotational angular position of the tire; one or more receivers each having one or more receiving antennas fixedly mounted on the vehicle, the one or more receiving antennas being positioned to receive the first signal and the second signal from a specific one of the tire/wheel assemblies; and circuitry for processing the first and second signals received by the one or more receiving antennas to determine the rotational angular position of the tire relative to the wheel of the one or more tire/wheel assemblies.

According to an aspect of the invention, at least one of the tire antennas is substantially circular and includes a plurality of reactive circuit affecting elements incorporated into and spaced about the circumference of the at least one tire antenna for causing blips which are indicative of the rotational angular position of the tire antenna to occur in the second signal received by the receiving antenna which is positioned to receive the second signal from the at least one tire antenna. Preferably, the at least one tire antenna which includes a plurality of reactive circuit affecting elements is mounted near the outer circumference of the tire.

According to an aspect of the invention, at least one of the wheel or wheel carrier antennas is substantially circular and includes a plurality of reactive circuit affecting elements incorporated into and spaced about the circumference of the at least one wheel or wheel carrier antenna for causing blips which are indicative of the rotational angular position of the wheel or wheel carrier antenna to occur in the first signal received by the receiving antenna which is positioned to receive the first signal from the at least one wheel or wheel carrier antenna.

According to an aspect of the invention, at least one of the tire antennas is a conductive hoop coupled to the tire transponder; and each conductive hoop tire antenna includes a plurality of reactive circuit affecting elements incorporated into and spaced about the circumference of the conductive hoop tire antenna for causing blips which are indicative of the rotational angular position of the conductive hoop tire antenna to occur in the second signal received by the receiving antenna which is positioned to receive the second signal from the at least one tire antenna. Preferably, the at least one conductive hoop tire antenna which includes a plurality of reactive circuit affecting elements is mounted near the outer circumference of the tire.

According to an aspect of the invention, at least one of the wheel or wheel carrier antennas is a conductive hoop coupled to the wheel or wheel carrier transponder; and each conductive hoop wheel or wheel carrier antenna includes a plurality of reactive circuit affecting elements incorporated into and spaced about the circumference of the conductive hoop wheel or wheel carrier antenna for causing blips which are indicative of the rotational angular position of the conductive hoop wheel or wheel carrier antenna to occur in the first signal received by the receiving antenna which is positioned to receive the first signal from the at least one wheel or wheel carrier antenna.

According to an aspect of the invention, a sub-receiver is associated with each of the one or more receiving antennas; and the sub-receivers assist a single receiver in processing the signals.

According to an aspect of the invention, there can be one receiving antenna for each specific tire/wheel assembly; and each receiving antenna is configured to receive the first signal at a first frequency from the wheel or wheel carrier antenna of the specific tire/wheel assembly, and is configured to receive the second signal at a second frequency from the tire antenna of the specific tire/wheel assembly. Alternatively, there can be a tire receiving antenna for each specific tire antenna, wherein the tire receiving antenna is positioned by fixedly mounting it on a wheel housing in close proximity to the tire antenna on the tire; and there is a wheel or wheel carrier receiving antenna for each specific wheel or wheel carrier antenna, wherein the wheel or wheel carrier receiving antenna is positioned by fixedly mounting it on an axle housing in close proximity to the wheel or wheel carrier antenna on the wheel or wheel carrier.

According to an aspect of the invention, one or more of the tire transponders and of the wheel or wheel carrier transponders is a passive transponder; and the receiver and receiving antenna associated with each of the one or more passive transponders transmit an interrogating signal to the associated passive transponder.

Other objects, aspects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
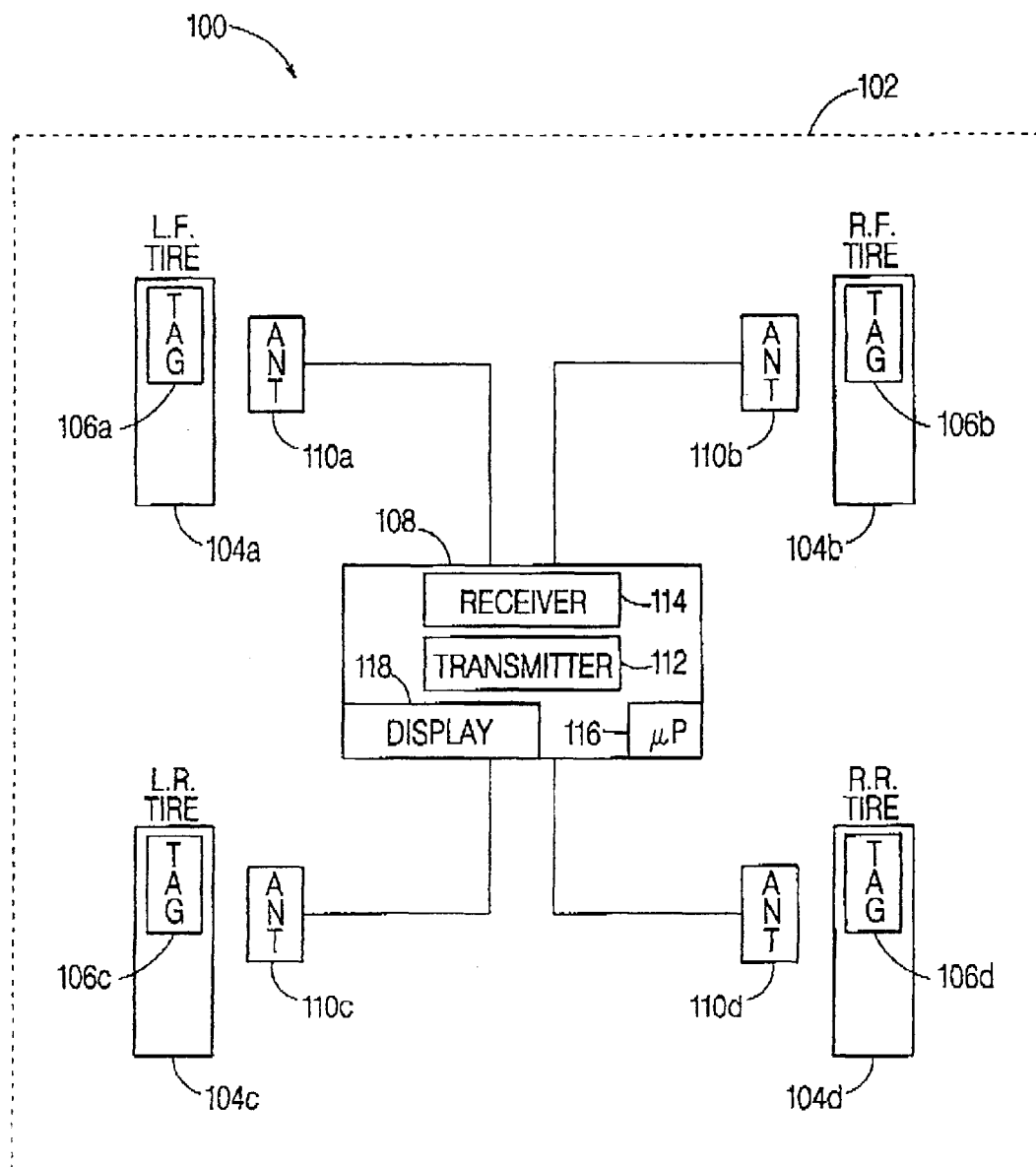
Figure 2:
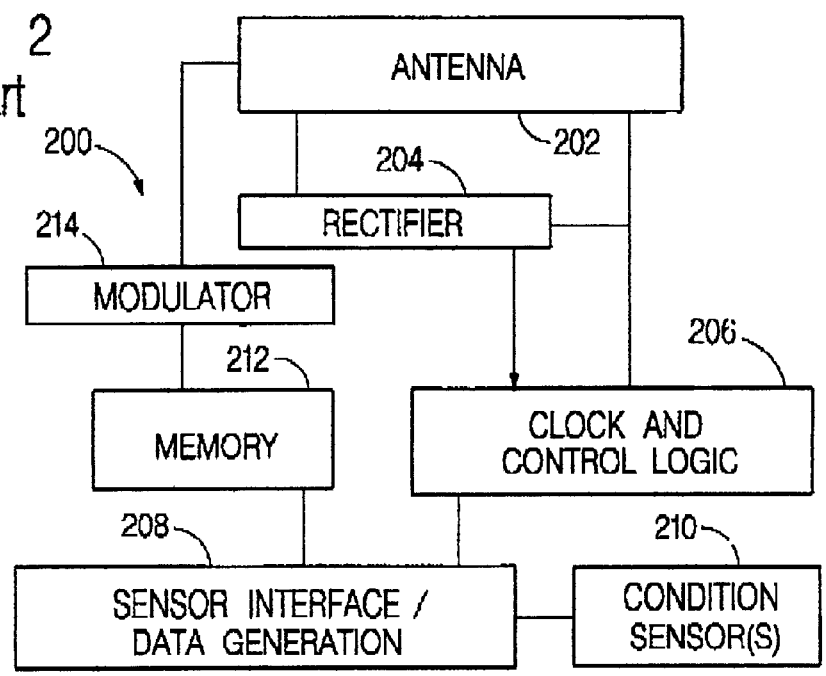

Elements of the figures are typically numbered as follows. The most significant digit (hundreds) of the reference number corresponds to the figure number. Elements of FIG. 1 are typically numbered in the range of 100–199. Elements of FIG. 2 are typically numbered in the range of 200–299. Similar elements throughout the drawings may be referred to by similar reference numerals. For example, the element 199 in a figure may be similar, and possibly identical to the element 299 in another figure. In some cases, similar (including identical) elements may be referred to with similar numbers in a single drawing. For example, each of a plurality of elements 199 may be referred to individually as 199a, 199b, 199c, 199d, or the plurality may be referred to collectively as 199, or as 199a . . . 199d. Such relationships, if any, between similar elements in the same or different figures will become apparent throughout the specification, including, if applicable, in the claims and abstract.

Figure 1A:
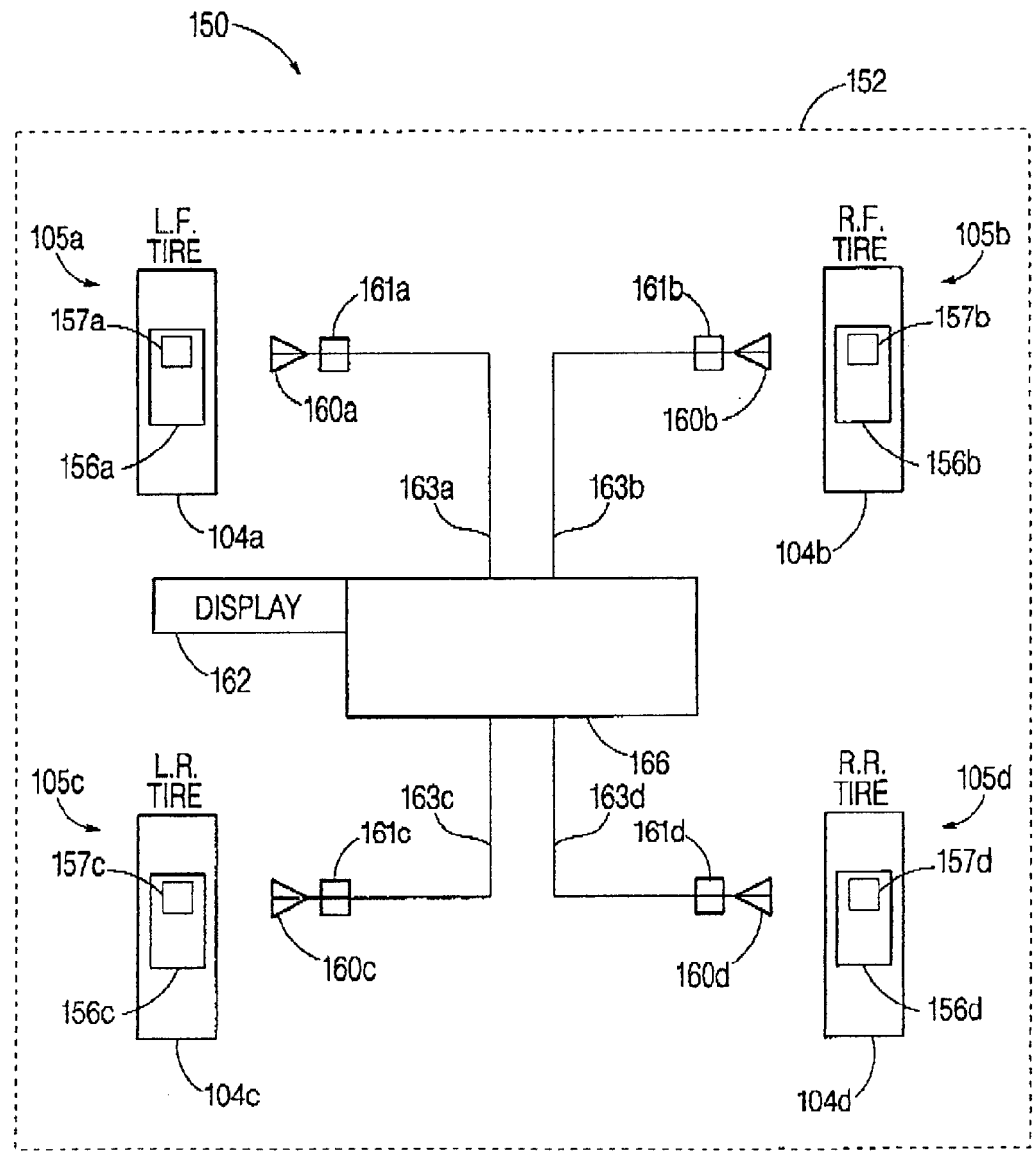
Figure 1B:
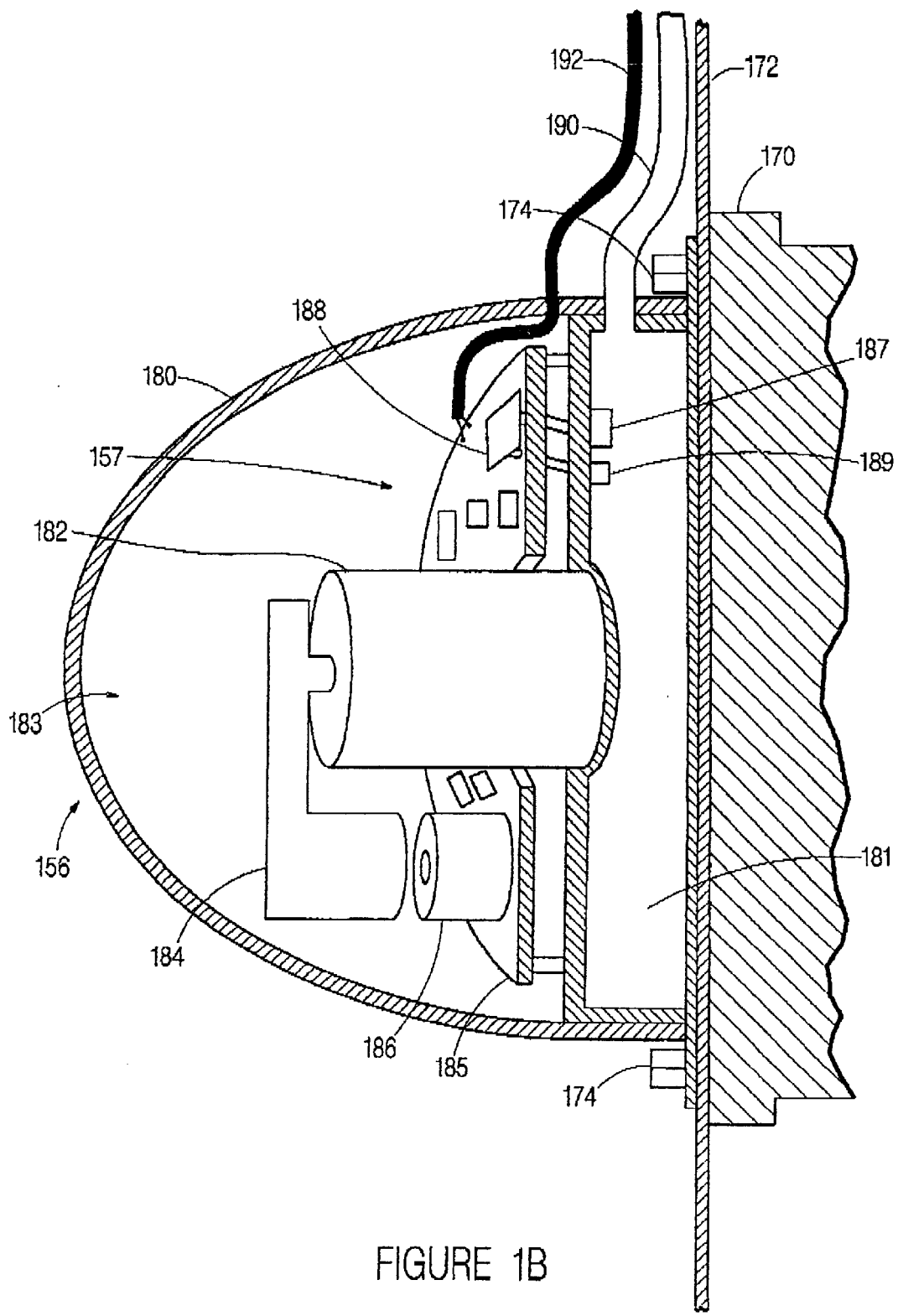
Figure 5:
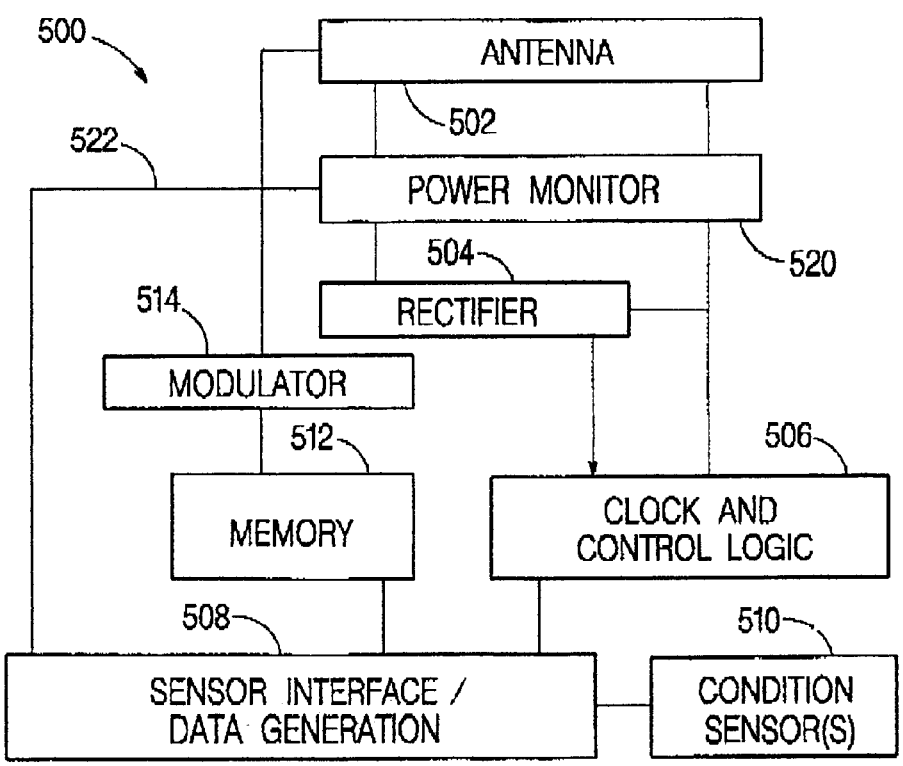
Figure 3A:
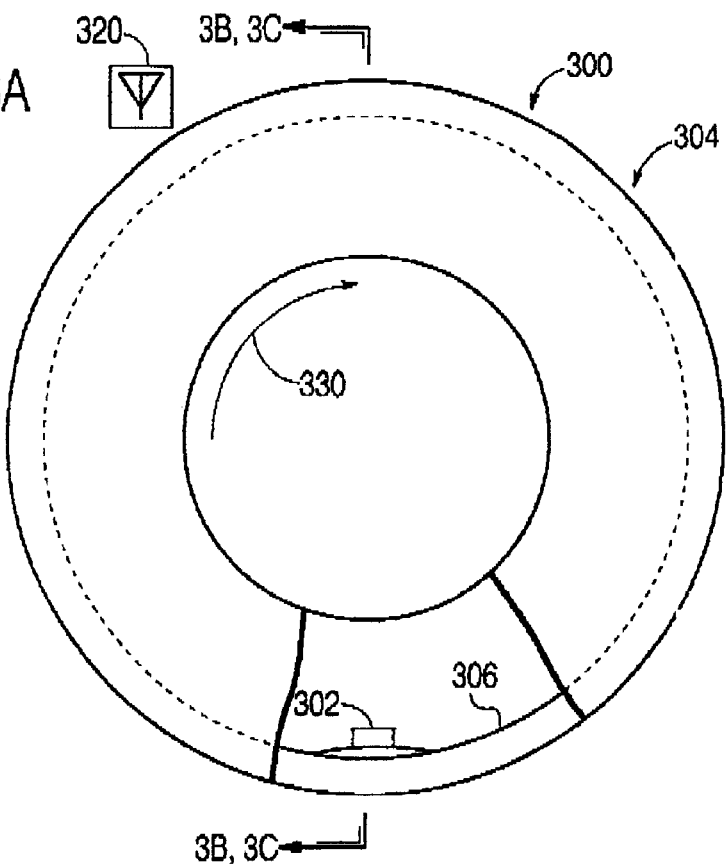
Figure 3B:
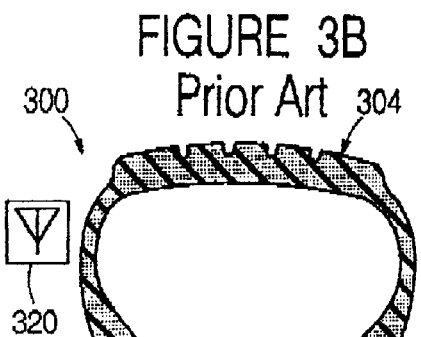
Figure 3C:
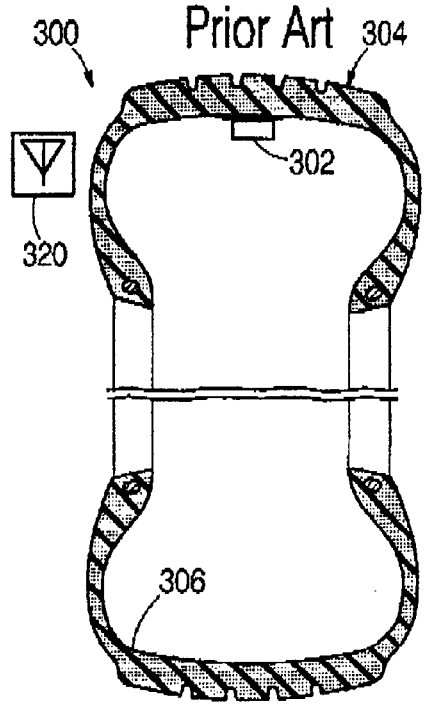
Figure 4:
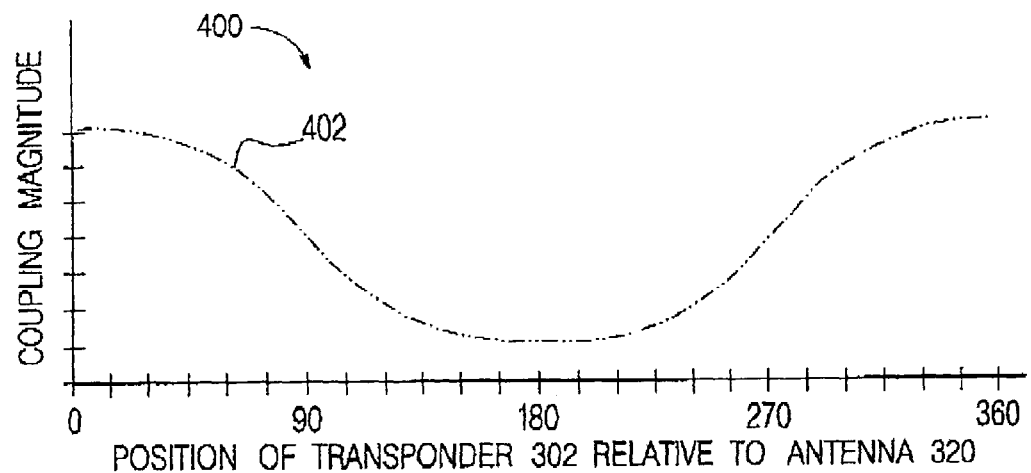
Figure 7:
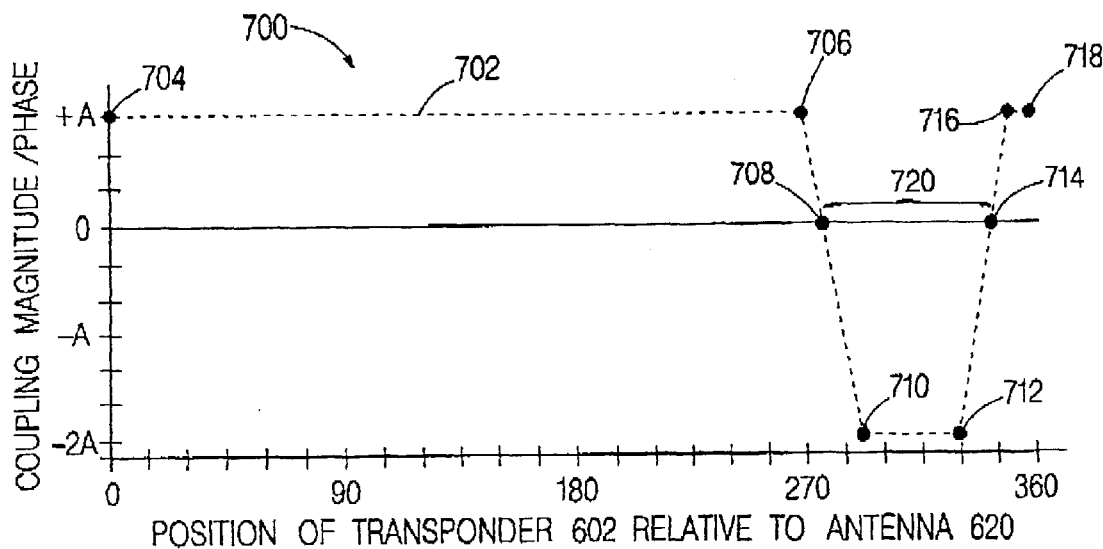
Figure 6A:
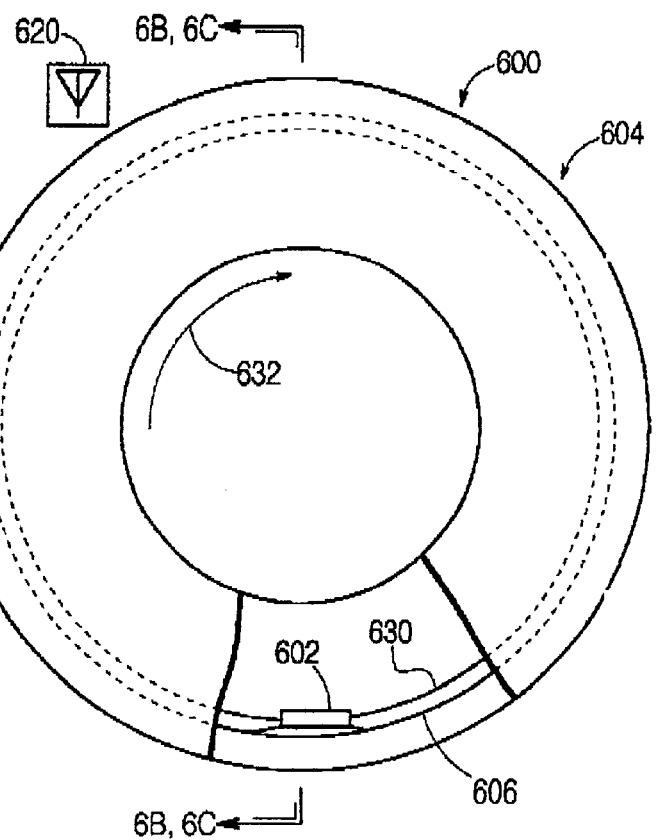
Figure 6B:
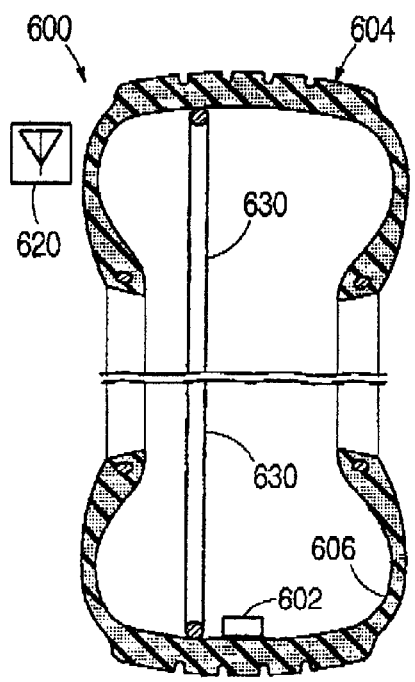
Figure 6C:
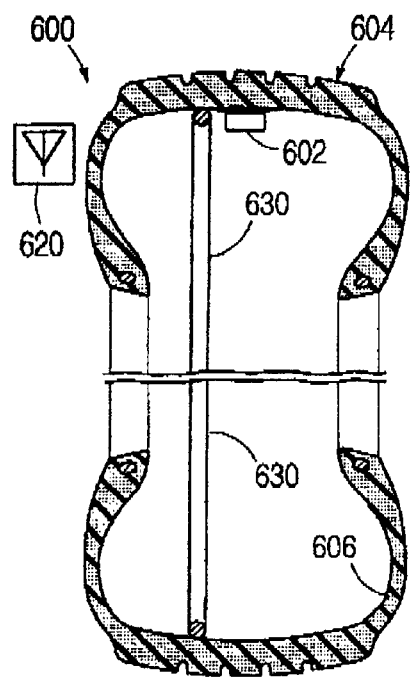
Figure 8:
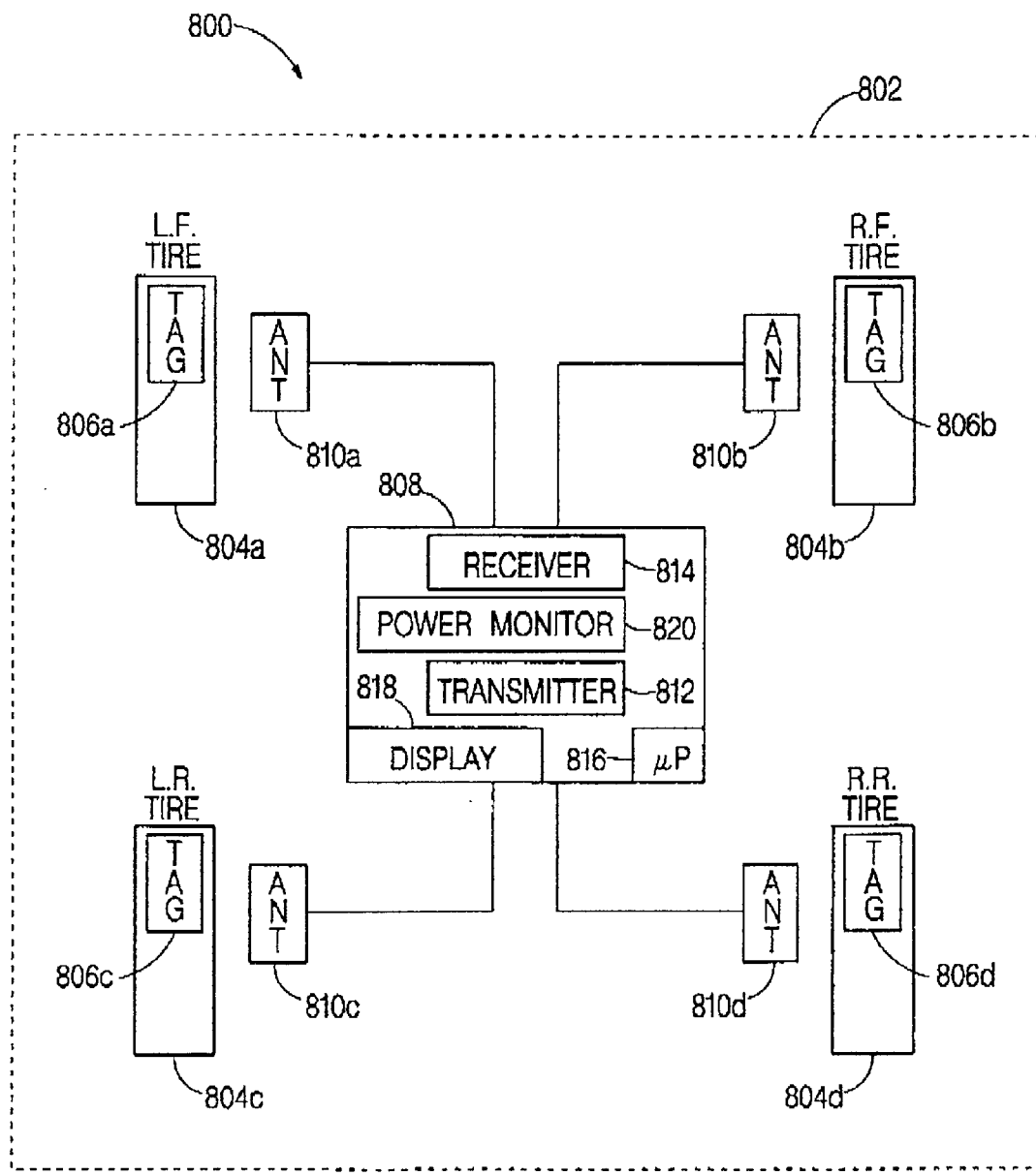
Figure 9:
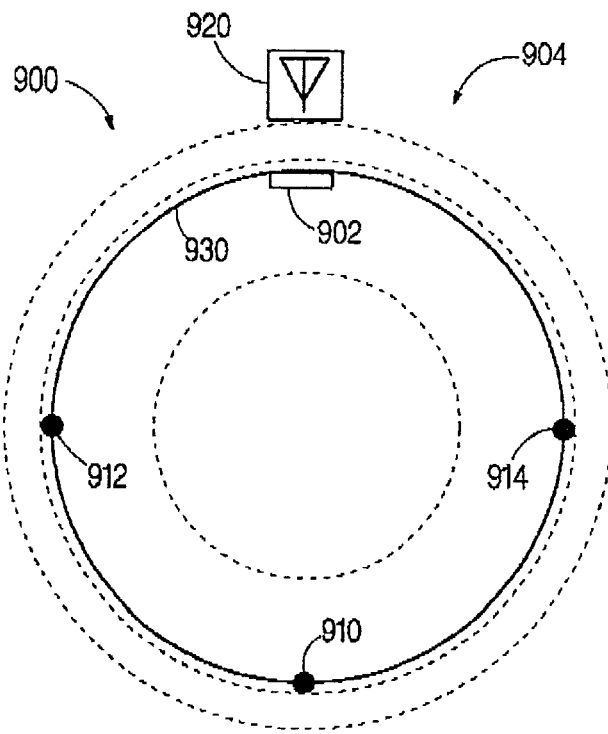
Figure 9A:
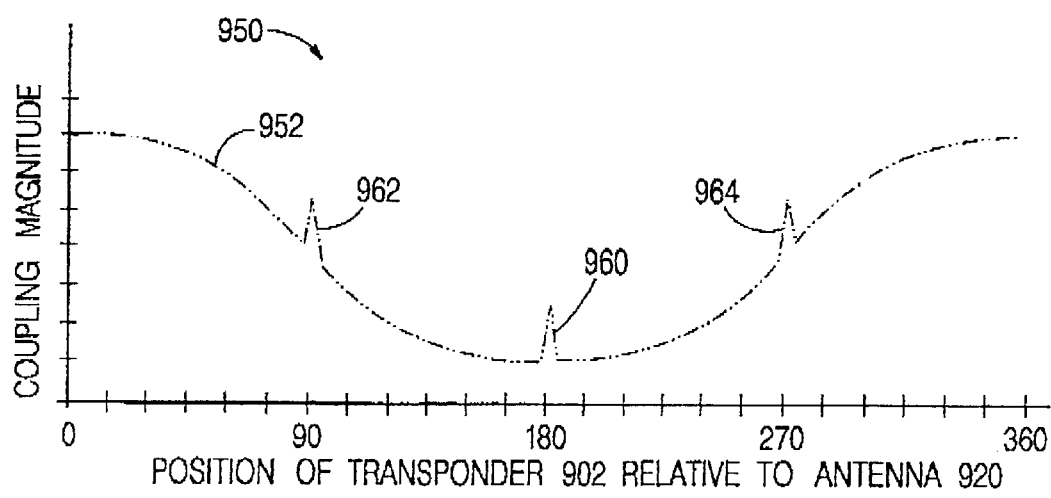
Figure 10:
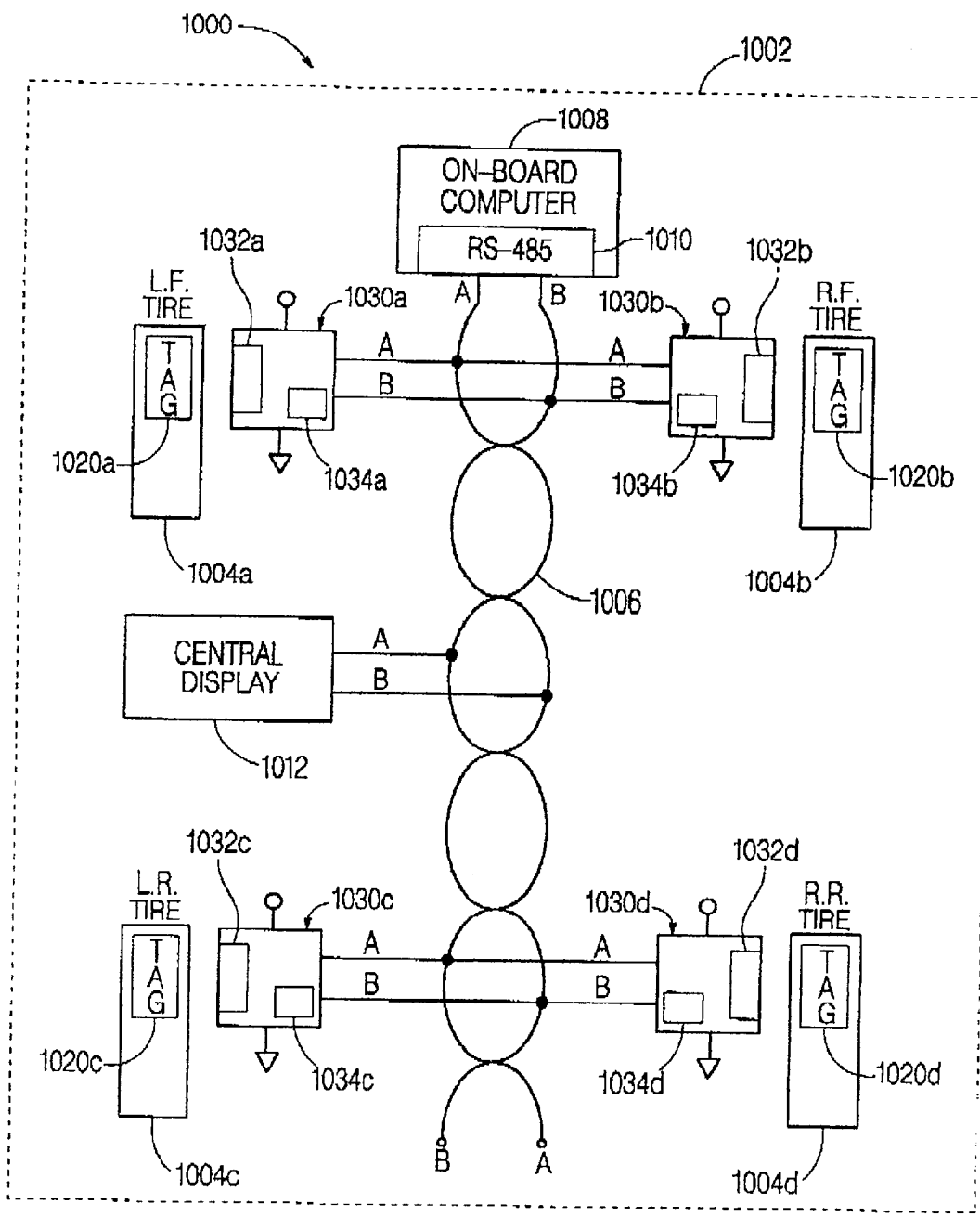
Figure 11:
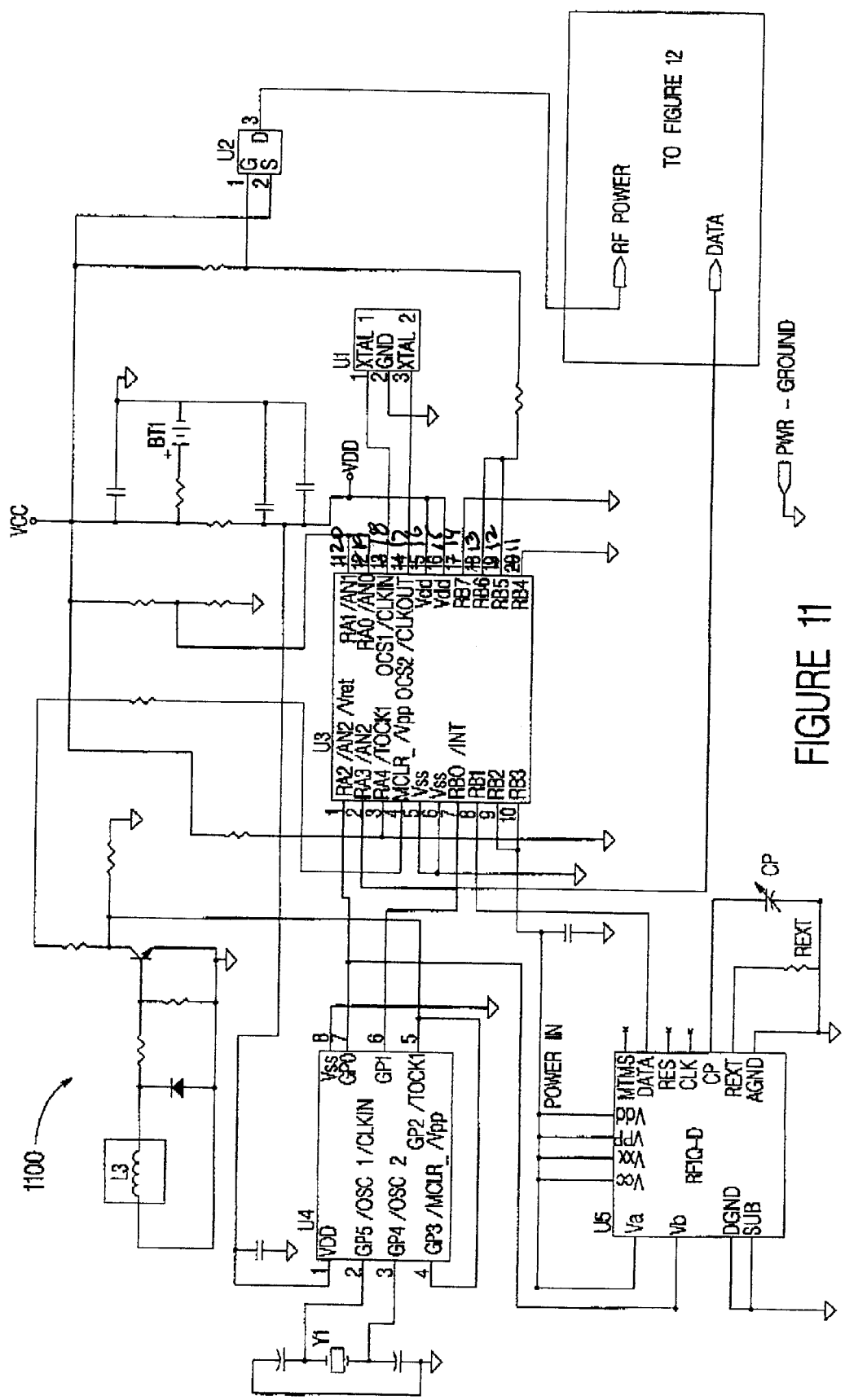
Figure 12:
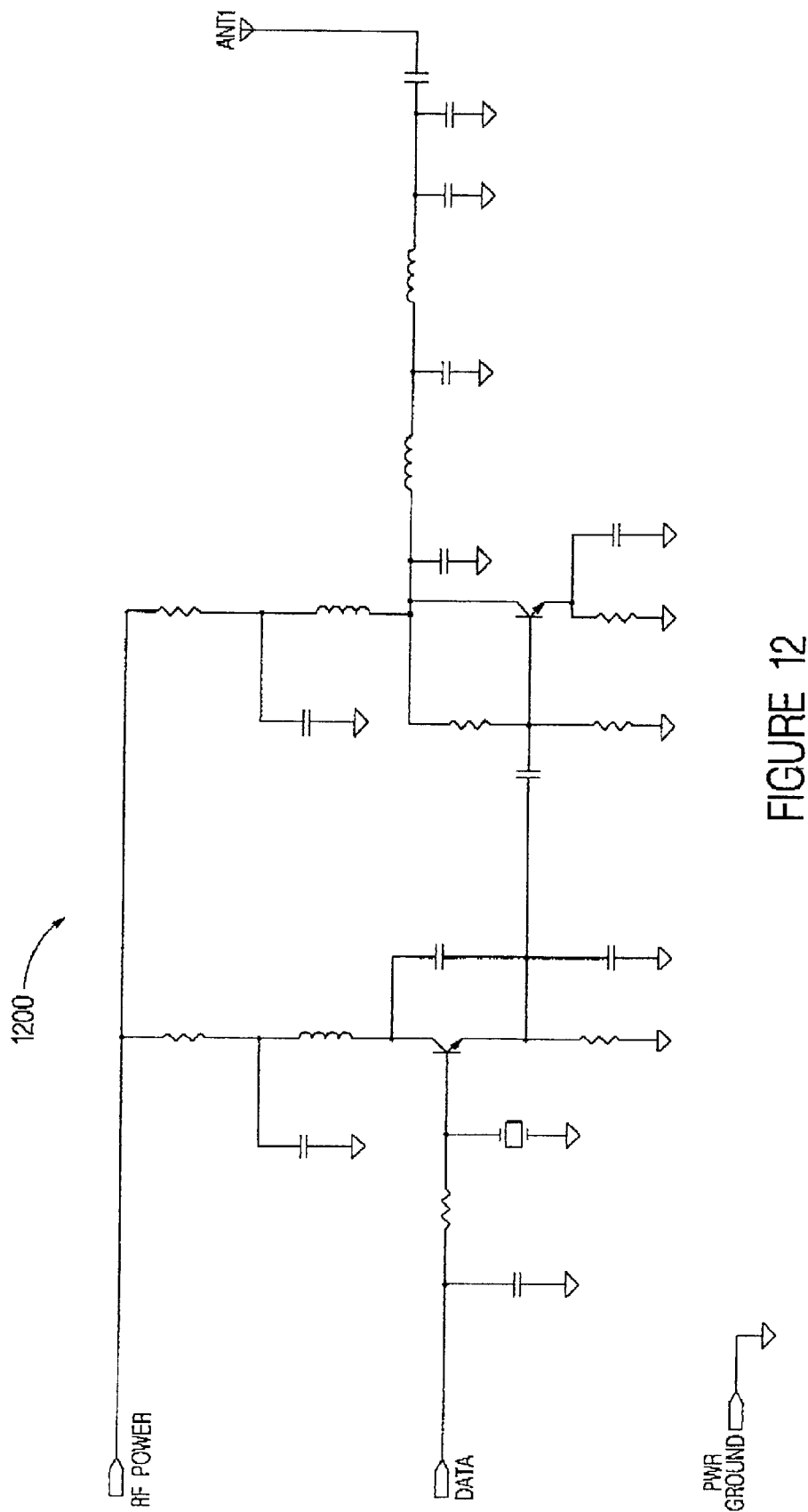
Figure 13:
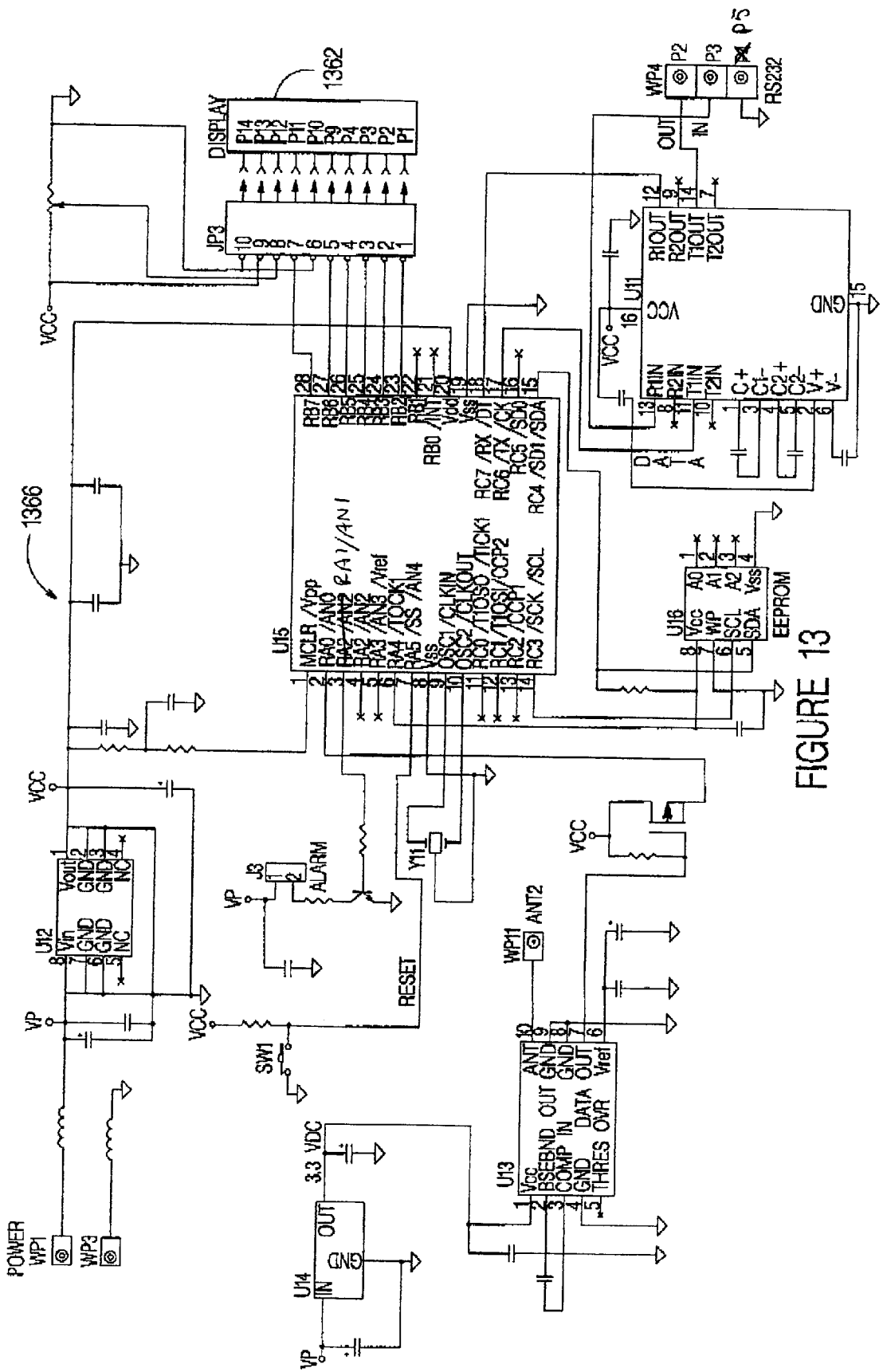
Figure 14:
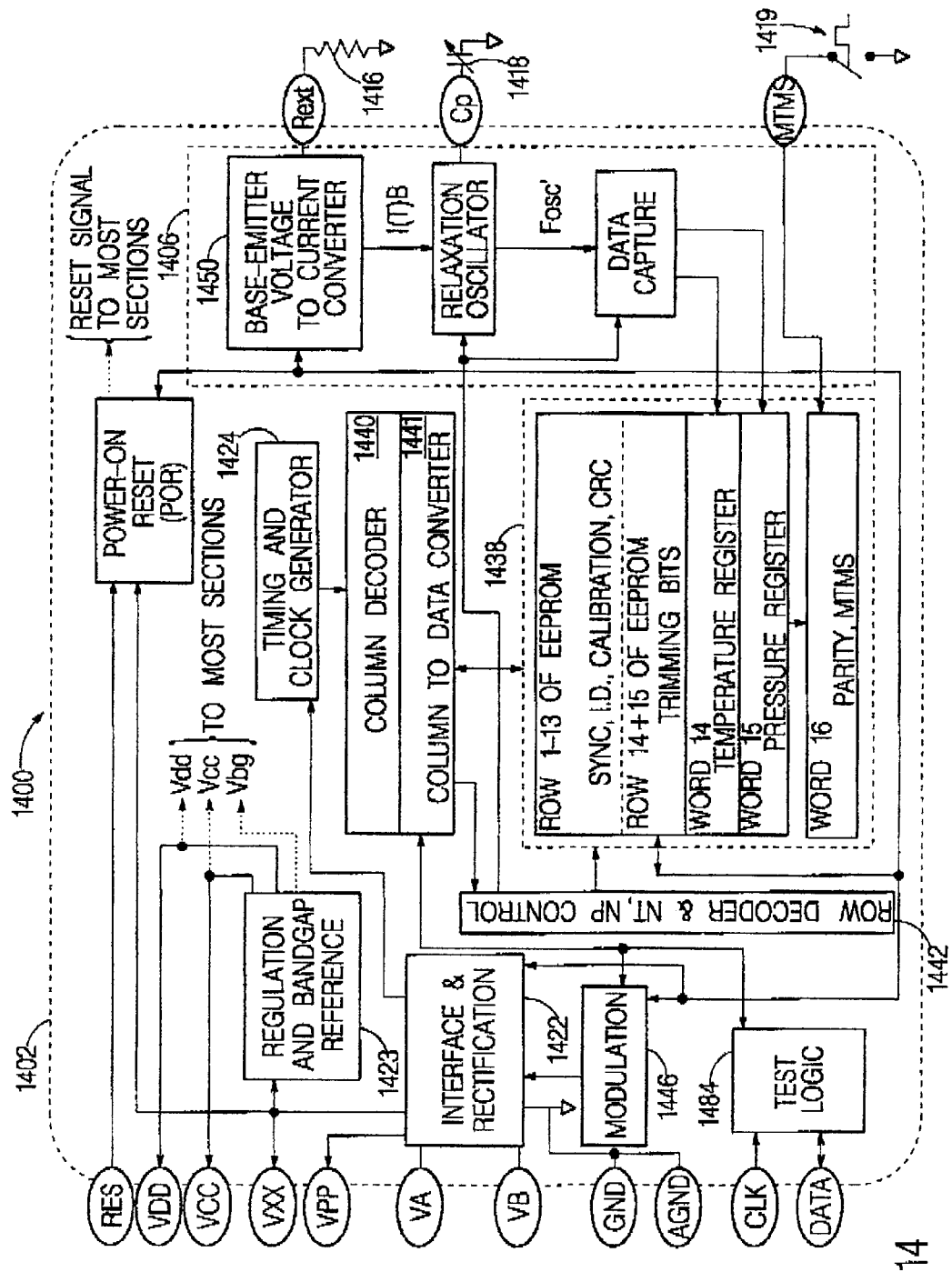
Figure 15:
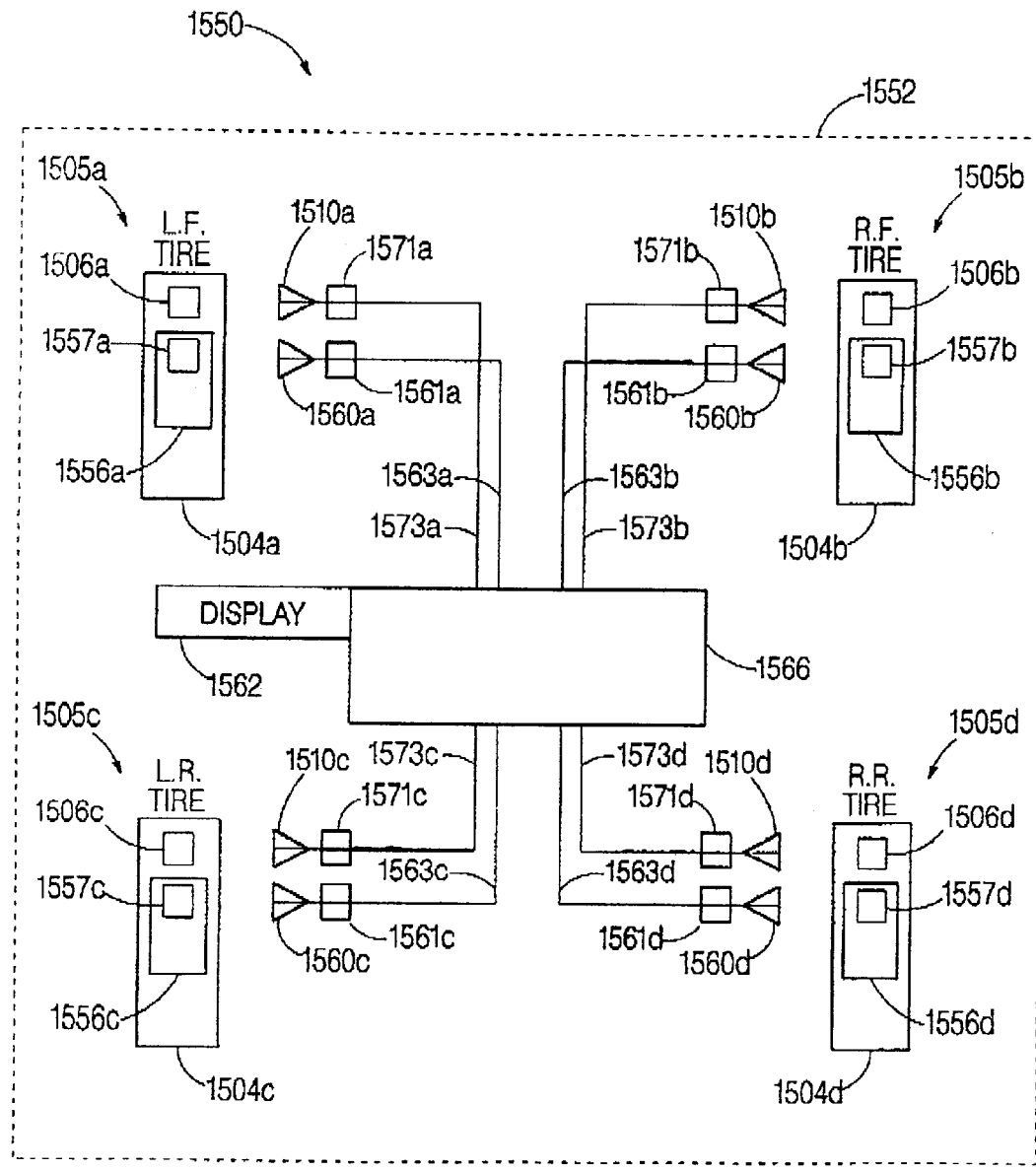

The structure, operation, and advantages of the present preferred embodiment of the invention will become further apparent upon consideration of the following description taken in conjunction with the accompanying drawings, wherein:

FIG. 1 is a simplified block diagram of a tire pressure monitoring system, according to the prior art;

FIG. 1A is a simplified block diagram of a tire monitoring and regulating system having features according to the invention;

FIG. 1B is a cross-sectional view of a wheel-mounted portion of the tire monitoring and regulating system of FIG. 1A;

FIG. 2 is a simplified block diagram of a passive transponder, according to the prior art;

FIG. 3A is a side plan view, partially sectioned, of a tire having a transponder mounted therein, according to the prior art;

FIG. 3B is a cross-sectional view of the tire of FIG. 3A, taken on a line 3B—3B through FIG. 3A, according to the prior art;

FIG. 3C is a cross-sectional view of the tire of FIG. 3A, rotated 180 degrees, taken on a line 3C—3C through FIG. 3A, according to the prior art;

FIG. 4 is a graph of coupling strength between the interrogator antenna and transponder of FIG. 3A;

FIG. 5 is a simplified block diagram of a passive transponder, according to the invention;

FIG. 6A is a side plan view, partially sectioned, of a tire with a transponder and a hoop coupling element disposed therein;

FIG. 6B is a cross-sectional view of the tire of FIG. 6A, taken on a line 6B—6B through FIG. 6A;

FIG. 6C is a cross-sectional view of the tire of FIG. 6A, rotated 180 degrees, taken on a line 6C—6C through FIG. 6A;

FIG. 7 is a graph of coupling strength between the interrogator antenna and transponder of FIG. 6A;

FIG. 8 is a block diagram of a tire pressure monitoring system, according to the present invention;

FIG. 9 is a side plan view of a tire with a transponder and a hoop coupling element disposed therein, with the tire shown in phantom;

FIG. 9A is a graph of coupling strength between the interrogator antenna and transponder of FIG. 9;

FIG. 10 is a block diagram of a condition monitoring and control system, according to the invention;

FIG. 11 is a schematic diagram of the circuitry for a wheel mounted tire condition monitor;

FIG. 12 is a schematic diagram of the circuitry for a transmitter portion used in conjunction with the tire condition monitor of FIG. 11;

FIG. 13 is a schematic diagram of the circuitry for a tire condition monitoring system receiver;

FIG. 14 is a block diagram of the circuitry for an exemplary tire condition monitoring integrated circuit chip to be used by the tire condition monitor of FIG. 11;

FIG. 15 is a simplified block diagram of a condition monitoring system, according to the invention;

FIG. 16A is a side plan view, partially sectioned, of a tire with a transponder and a hoop coupling element disposed therein plus a wheel or wheel carrier mounted transmitter and antenna, according to the invention; and FIG. 16B is a cross-sectional view of the tire and wheel of FIG. 16A, taken on a line 16B—16B through FIG. 16A, according to the invention.

DETAILED DESCRIPTION OF THE INVENTION

FIG. 1 illustrates a typical tire pressure monitoring system 100 of the prior art installed on a motor vehicle 102 (shown in dashed lines) having four pneumatic tires 104a . . . 104d (104) installed on four respective wheels (not shown). A transponder ("TAG") 106a, 106b, 106c, 06d (106) is disposed within each of the tires 104, respectively. The transponders 106 are preferably passive transponders which obtain their operating power from an RF signal such as is typically generated by an on-board interrogator 108 which is mounted within the vehicle.

The interrogator 108 comprises an RF transmitter 112 (e.g., for powering passive transponders), an RF receiver 114, control logic 116 which may include a microprocessor ($\mu$P), and a display device 118 such as a visual display and optionally including an audible alarm. Antennas ("ANT") 110a . . . 110d are disposed on the vehicle 102, preferably adjacent the tires 104a . . . 104d, respectively, such as in the wheel wells of the vehicle. The antennas 110 are suitably ferrite loopstick antennas.

The use of multiple vehicle antennas 110a . . . 110d, each at a fixed position on the vehicle adjacent a respective tire 104a . . . 104d is well known and preferred, and is disclosed in U. S. Pat. Nos. 3,553,060; 3,810,090; 4,220,907; 5,541, 574; and 5,774,047, all of which are incorporated in their entirety by reference herein.

In use, the interrogator 108 powers the transponders 106a . . . 106d which, in turn, transmit data indicative of a measured condition (e.g., air pressure) back to the interrogator. In any such system, it is desirable to have efficient and effective coupling of signals between the fixed antennas 110a . . . 110d (alternatively, one centrally-located fixed antenna) and the moving (i.e., when the vehicle is in motion) transponders (each of which has its own antenna, not shown).

FIG. 1A illustrates a tire monitoring and regulating system 150 having features according to an embodiment of the invention. The system 150 is installed on a motor vehicle 152 (shown in dashed lines) having four pneumatic tires 104a . . . 104d (104) installed on four respective wheels (not shown) to form four respective tire/wheel assemblies 105a . . . 105d (105). Mounted on the wheel or wheel carrier of each tire/wheel assembly 105 is a tire monitoring and regulating device 156a . . . 156d (156) which includes at least a tire condition monitor 157a . . . 157d (157), which is similar in many respects to the transponder 106 disposed within the tires 104, as illustrated in FIG. 1. Each monitor 157 is preferably an active (e.g., battery powered) circuit capable of measuring the pneumatic (air) pressure (and optionally temperature) of its respective tire 104, of measuring rotation of the wheel or wheel carrier of the assembly 105, and of transmitting RF signals containing data such as pressure by means of an antenna (not shown). Mounted on the vehicle 152, preferably in or close to the vehicle operator's cab, is a receiver 166 which may include a display device 162 such as a visual display and optionally including an audible alarm.

The receiver 166 preferably has a single antenna 160 such as an internal patch type antenna that is etched onto the receiver's electronics PC board or such as an external dipole type antenna. A variation of this preferred embodiment is illustrated in FIG. 1A showing a distributed receiving system wherein the antenna 160 is shown as four antennas 160a . . . 160d (e.g., loopstick antennas), each antenna 160a . . . 160d optionally having an associated subreceiver module 161a . . . 161d (161), and each antenna 160a . . . 160d being fixedly mounted on the vehicle 152 in close proximity to the transmitters of the wheel or wheel carrier mounted monitors 157a . . . 157d, e.g., mounted on the axle housing close to the wheel hub. It is within the scope of the invention that the sub-receivers 161 communicate with the receiver 166 by various means such as, for example, either by means of individual wires 163a . . . 163d (163) or by means of wireless RF transmission. The wires 163 may also be, for example, a multiplexed serial data bus (e.g., the RS-485 or equivalent vehicle data bus 1006 described hereinbelow with reference to FIG. 10). In the apparatus having a single receiving antenna 160, each of the monitors 157a . . . 157d include a unique identification code (ID), e.g., a 10-bit number, as part of the data contained in the RF signal transmitted by the monitor 157. The receiver 166 is trained to only recognize ID codes from monitors 157 which are mounted on the particular vehicle 152, and to associate each recognized ID code with the appropriate tire/wheel position on the vehicle 152. In the system having antennas 160a . . . 160d, a simpler monitor 157 can be employed which does not utilize an ID code, since the tire/wheel position on the vehicle 152 is simply determined according to which antenna 160a . . . 160d is receiving the signal. It can be seen that this multi-antenna arrangement also simplifies any tire rotation or replacement procedure.

The motor vehicle 152 of the system 150 has been described as a four-wheeled vehicle, such as an automobile. It should be understood that the scope of the invention includes other embodiments with more or less tire/wheel assemblies, for example a truck having 16 or more tire/wheel assemblies, or for example one or more tire/wheel assemblies on the landing gear of an aircraft.

FIG. 1B is a cross-sectional view of a wheel-mounted portion of the tire monitoring and regulating system of FIG. 1A. The tire monitoring and regulating device 156 is mounted on the wheel 172 and both device 156 and wheel 172 are mounted on the axle hub 170 by standard means such as wheel mounting nuts 174. The tire monitoring and regulating device 156 has a protective housing 180 and contains at least the tire condition monitor 157 which is shown as a printed circuit board 185 with circuit elements attached. In the illustrated system, the housing 180 also contains a tire pressurizing and regulating apparatus 183 such as the apparatus of the Renier/Cycloid '606 Patent described in the background hereinabove. Important features of the apparatus 183 include an air pump 182 for pressurizing a cavity 181 connected by an air pressure connection conduit 190 to the interior of the tire 104 (not shown) which is mounted on the wheel 172; and a pendulum 184 which provides the driving force to the pump 182 (through a cam arrangement not shown) by hanging vertically while the pump 182 and the monitor 157 rotate with the wheel 172 and axle hub 170 to which they are mounted.

The tire condition monitor 157 comprises the PC board 185 (with circuitry to be described hereinbelow) and elements including one or more coils 186 and a transponder circuit chip 188. An antenna 192 is preferably a partial loop type antenna etched as a trace (not shown) to the outside of the PC board 185, but is optionally an external antenna mounted on the wheel or wheel carrier (e.g., antenna 1650 illustrated in FIGS. 16A and 16B). Associated with the transponder circuit chip 188 are condition sensors 187 and 189, where sensor 187 is a pressure sensor and is mounted in or communicating with the cavity 181 in order to sense the pressure of the air in the cavity 181 (and thus in the tire 104). The sensor 189 is optionally a temperature sensor such as a thermistor and may be mounted in the cavity 181 as shown, or may be incorporated in the transponder circuit chip 188, or mounted anywhere else such as on the printed circuit board 185 or on the wheel 172. Obviously, the mounting location of the optional temperature sensor 189 will determine how accurately the sensor 189 can determine the actual temperature of the air inside the tire 104.

The one or more coils 186 are utilized to indicate rotation of the wheel 172 using known means such as generating a pulse whenever a coil 186 passes under the pendulum 184 which suitably incorporates a magnet or appropriate metallic content. With a single coil 186 and a pendulum 184 having a single arm passing over the coil 186, it can be seen that only one pulse will be generated per revolution of the wheel 172, and such pulses can be counted and timed to determine quantity of revolutions and speed of revolution. Means other than coils 186 can be utilized to detect revolution of the wheel 172 (and PC board 185) relative to the pendulum 184, for example, an optical sensor. By employing multiple coils 185, or by adding multiple lobes to the pendulum (e.g., a star wheel or toothed wheel) any desired resolution of the angle of revolution may be obtained, as in an angular position encoder.

FIG. 2 illustrates, generally, an exemplary prior art passive RF transponder 200 (compare 106, 188). An antenna 202, such as a coil antenna, receives a carrier signal from the interrogator 108 (via antennas 110a . . . 110d). The carrier signal, of frequency F, is rectified by a rectifier circuit 204 connected to the transponder's antenna 202 in order to generate operating power for active circuitry in the transponder—in this example, for clock and control logic circuitry 206 and for sensor interface and data generation circuitry 208. Data derived from one or more condition sensor(s) 210, such as a temperature sensor and a pressure sensor, is optionally stored in memory 212, and is encoded (e.g., digitized) and mixed with the carrier signal in a modulator circuit 214. The output of the modulator circuit 214 is transmitted via the antenna 202 back to the interrogator 108 (compare receivers 161, 166). It is well understood that the clock and control logic circuitry 206 can derive a clock signal in a straightforward manner from the RF carrier signal transmitted by the interrogator 108. For example, the carrier signal illuminating (powering) the transponder may be at 125 kHz and may be passed through a "divide-by-10" divider circuit (not shown) to generate clock pulses at 12.5 kHz. It is also well understood that clock signals can be counted by a counter (not shown), and that an accumulated count in a counter can be digitized and transmitted by a transponder.

FIG. 14 illustrates the general circuitry of an exemplary transponder circuit chip 1400 (compare 106, 188, 200) which is particularly suited for use as the transponder 188 which is incorporated in the monitor apparatus 157 illustrated in FIGS. 1A and 1B. The transponder 1400 is the Goodyear/Phase IV "RFIQ-D" custom ASIC which is described in detail in the co-pending PCT Patent Application PCT/US99/18610 incorporated in its entirety by reference herein, and having a common assignee with the present application. Contained on the IC chip 1402, are interface 1422 and modulation 1446 sections (compare 214) and connection pads VA and VB for an external antenna (compare 202, 192). Rectification 1422 and regulation 1423 sections (compare 204) provide operating power, and a timing/clock section 1424 works with column decoder 1440, column to data converter 1441, and row decoder/control 1442 sections to provide control logic (compare 206). Data derived from external condition sensors (compare 210) for temperature 416 (compare 189), pressure 418 (compare 187), and excessive temperature 1419, is processed in a sensor interface/data generation section 1406 (compare 208), stored in memory 1438 (compare 212), and encoded for transmission by the modulation section 1446 (compare 214). A test logic section 1484 can be used for a direct output of data via the DATA terminal instead of RF transmission in cases where the transponder 1400 is used as part of a larger circuit such as the monitor 157 circuitry which will be described hereinbelow. It should be noted that the primary means of sensing temperature is the base-emitter voltage to current converter 1450 which is integrated in the IC chip 1402 and utilizes an external precision resistor Rext, however the external "temperature sensor" 1416 can also be temperature sensitive, utilizing a thermistor, for example, in place of or in combination with the precision resistor Rext. The external pressure sensor 1418 is suitably a capacitive pressure sensor, for example a Delco TCAP-4 or a Fujikura FCAP-4

FIG. 11 (circuit portion 1100) and FIG. 12 (circuit portion 1200) illustrates monitor 157 circuitry as implemented on the printed circuit board 185. In this implementation, there is a single coil L3 (compare 186) that is used for counting revolutions of the PCB 185 relative to the pendulum 184. The circuit 1100 employs two microcontrollers U3, U4, and the RFIQ-D transponder U5 (compare 1400) to control the gathering of input data from the sensors CP (1418) and REXT (1416) and the coil L3 (186). Output data is sent to the RF circuit portion 1200 for RF transmission by means of an antenna ANTI (compare 192). The monitor 157 employs a battery BT1 (suitably a Lithium Thional Chloride battery such as an Eagle Picher LTC-3PN battery, 350 mA-Hr, 3.6V nominal) for power supplies VCC and VDD to the circuitry 1100, and is interfaced by circuit element U2 (suitably an NDS0610CT chip) to provide the RF POWER to the RF circuitry 1200. The use of such a battery BT1 allows the transponder chip U5 to be used in active mode, instead of relying on RF transmissions to generate power internally, so the transponder chip U5 is connected appropriately with power being supplied by the microcontroller U3 to all voltage terminals Va, VCC, VXX, VPP, and VDD.

In operation during vehicle motion (as detected by the coil L3), the clocking microcontroller U4 (e.g., a Microchip PIC 12CLC509A running at 32 kHz in conjunction with an oscillator Y1) runs continuously, and periodically wakes the monitoring microcontroller U3 (e.g., a Microchip PIC 16LC622A running at 4 MHz in conjunction with an oscillator U1). The clocking microcontroller U4 monitors the coil L3, accumulates and stores a revolution count, and provides the basic system timing including a clock signal output on the GP0 pin 7 to the monitoring microcontroller U3 (pin 1) and to the transponder U5 (VB terminal). When the monitoring microcontroller U3 is wakened by an interrupt at pin 7 "RB0/INT", it turns on power at pins 9 and 10, "RB2" and "RB3" to activate the transponder U5 for sensor readings. The data from the transponder U5 (including pressure, temperature, and an ID code) is output as a serial data string on the DATA terminal of the transponder U5 and received at the pin 8 "RB1" terminal of the monitoring microcontroller U3. The monitoring microcontroller U3 combines the sensor data from the transponder U5 and the revolution count from the clocking microcontroller U4 to form a transmission data string which is output on the pin 2 "RA3/AN2" terminal to the DATA line of the RF circuitry 1200.

The transmission data string is, for example, formed into message packets in the 4B/5B format using straight NRZI for bit determination. Each packet begins with a 10 bit sync pattern which is not further encoded. The sync pattern is 1101001010. Following the sync pattern is a 10 bit ID number, the last two bits of which determine wheel or wheel carrier position. Next are 6 bits of pressure data (0–63 PSI gauge), 8 bits of temperature data (degrees C. preceded by a sign), and a 16 bit accumulated revolution count. At the end of the packet is an 8 bit CRC. This gives a total of 48 bits (excluding the sync bits) which are encoded into 60 bits by the 4B/5B coding scheme. The total packet length, including sync, is 70 bits so that a packet can be transmitted in 19.44 msec at a rate of 3600 bits per second (BPS).

FIG. 12 illustrates an embodiment of the RF transmitter circuitry 1200. The circuit 1200 employs standard RF circuit design elements with component values suitable to achieve the desired RF transmission characteristics for transmitting the transmission data packet which is on the DATA line as supplied by the circuitry 1100 of FIG. 11. The RF transmitter, for example, operates at 315 MHz or 418 MHz in the U.S. and Canada, 433.92 MHZ in Europe, and 303.825 MHz in Japan; with an RF power output of approximately 0 dBM at the antenna port (except considerably less in Japan), employing a SAW (Surface Acoustic Wave) resonator as the basic RF frequency generating element. The transmitters are certifiable in the U.S. under FCC part 15.231 to be used as unlicensed transmitters and under similar provisions in other countries. Frequency stability is +/– 75 kHz at 25 degrees C., with a temperature coefficient no greater than 0.032 ppm/degree C.

FIG. 13 illustrates an embodiment of the receiver 1366 (compare 166) as it would be configured for a single-antenna system (e.g., FIG. 1A system 150 with a single, centrally-located antenna 160 and no optional sub-receiver 161). The receiver 1366 is controlled by a microcontroller U15 (e.g., a Microchip PIC16C73B running at 4 MHz in conjunction with a ceramic resonator Y11) which receives a serial data string message packet by means of an antenna ANT2 (compare 160), decodes the packet data, accumulates a total revolution count for each tire/wheel assembly 104 and stores these counts in an EEPROM memory chip U16, calculates a temperature-corrected pressure from the packet data, and outputs suitable information to a display 1362 (compare 162, for example, a 2-line by 16 character LCD display), to a connector WP4 for an RS-232 serial line (for connection to an optional external PC computer, for example), and to a connector J3 for an alarm (e.g., a beeper which may be incorporated into the display 162). The microcontroller U15 also receives input from a momentary action pushbutton SW1, and resets all revolution counts to zero whenever the pushbutton SW1 switch is closed. The RS-232 serial connection WP4 is a two-way link allowing communication from an external PC in to the microcontroller U15 (e.g., for programming the microcontroller U15), as well as communication out (e.g., to output raw data decoded from the packet data).

The receiver 1366 is powered by connection through power connectors WP1, WP3 to the electrical system of the vehicle 152, at a nominal DC voltage level VP (typically 12 VDC). A DC voltage converter U12 converts VP to the VCC voltage level (e.g., 5 VDC) for use by most of the circuitry, except where noted. An RF demodulator U13 interfaces the antenna ANT2 to the microcontroller U15. The exemplary RF demodulator U13 requires a separate 3.3 VDC power supply which is provided by a DC voltage converter U14.

The pin numbers P1 . . . P14 for the display 1362 are shown as they should be connected to the pins 1 . . . 10 of the connector JP3. The RS-232 line (connector WP4) is interfaced to the microcontroller U15 by a serial port chip U11, with the microcontroller U15 transmitting TX line (pin 17) sending data out to the serial port chip U11 transmit-in T1 in (pin 11) which then converts the data according to the RS-232 protocol and transmits it out the T1 out (pin 14) to pin 2 (P2) of connector WP4. Incoming serial communications are received on pin 3 (P3) of connector WP4 leading to the serial port chip U 11 receive-in R1 in (pin 13) which then converts the RS-232 protocol data to a serial data string which is emitted from the U11 receive-out R1 out (pin 12) and sent to the microcontroller U15 receiving RX line (pin 18).

The specific components and values stated hereinabove for the circuitry of FIGS. 11, 12 and 13 are exemplary for incorporation within a preferred embodiment of the invention. No doubt, the skilled person will be able to utilize these teachings and make variations of these specifics that also accomplish the objectives of this invention, but such variations are considered to be within the scope of this invention.

An example of normal receiver 1366, 166 operation is as follows. Each time the receiver decodes a valid message it will beep and display information relating to the specific wheel or wheel carrier position identified in the message ID. The displayed pressure is in PSIG units (pounds per square inch gauge); temperature is displayed as plus or minus degrees C.; and wheel or wheel carrier revolutions will accumulate and be displayed to a total of 10 million at which point the total will roll over and start again from zero. The first line of the display will show wheel or wheel carrier position, pressure, and temperature. The second line shows total revolutions (rotations "ROT"). For example:

LF_P:35_T:+65C

ROT:08,555,444_

FIGS. 3A, 3B and 3C illustrate an RF transponder system 300 of the prior art comprising a passive transponder 302 (compare any of 106a . . . 106d, 200) disposed within a pneumatic tire 304 (compare any of 104a . . . 104d). In this example, the transponder 302 is a passive transponder, and is mounted in any suitable manner to an inner surface 306 of the tire 304. An antenna 320 (compare any of 110a . . . 110d) is disposed on the vehicle near the tire 304 such as in a wheel well, to provide electromagnetic radiation to power the transponder 302 (in the case of a passive transponder), as well as to receive signals from the transponder 302.

As illustrated in FIGS. 3A, 3B and 3C, the vehicle antenna 320 is fixedly disposed (positioned) at the "12 O'clock" orientation with respect to the tire 304, such as abreast of a top portion of the tire. It should be understood that the antenna 320 may be disposed at any position suitable for coupling electromagnetically with the transponder 302 without interfering with movement (e.g., rotation, steering, rebounding) of the tire 304.

As the tire 304 rotates (as indicated by the arrow 330), the transponder 302 will be alternately nearer to and farther from the antenna 320. As illustrated in FIGS. 3A and 3B, the tire 304 is oriented so that the transponder 302 is at the "6 O'clock" position with respect to the antenna 320. This being the furthest the transponder 302 can be from the antenna 320, the coupling of an RF signal between the antenna 320 and the transponder 302 will be relatively weak as compared with the coupling between the antenna 320 and the transponder 302 when the tire has rotated 180 degrees and the transponder 302 is in the "12 O'clock" position, as illustrated in FIG. 3C. Thus, it is evident that, as the tire 304 rotates, there will be cyclical fluctuations in the RF energy coupling between the antenna 320 and the transponder 302.

FIG. 4 is a graph 400 illustrating fluctuations in the coupling of RF energy between an antenna (e.g., 320) of an on-board interrogator (e.g., 108) and a transponder (e.g., 302) disposed within a pneumatic tire, such as has been described hereinabove. The x-axis is the angle (in degrees) between the transponder 302 and the vehicle antenna 320 as the tire rotates. Zero degrees is where the transponder 302 is closest to the antenna 320 (as in FIG. 3C), and 180 degrees is where the transponder 302 is farthest from antenna 320 (as in FIG. 3B). The y-axis is coupling magnitude, in arbitrary units. Generally, the coupling strength varies cyclically, and inversely with the distance between the interrogator antenna (e.g., 320) and the transponder (e.g., 302) as illustrated by the line 402. It can be observed that the coupling strength is maximum, when the wheel or wheel carrier as it turns under operating conditions, so that the transponder is next to the antenna 320 and quickly decreases as the transponder moves away from the antenna.

Sensing Fluctuations at the Transponder

The aforementioned U.S. Pat. No. 5,319,354 recognizes that there will be coupling variations such as have been described with respect to FIG. 4, and teaches that such coupling strength fluctuation is detrimental to powering and communicating with the transponder, and describes a construction of an interrogation antenna so that, regardless of the position of the transponder in the pneumatic tire, the coupling is always of the same quality.

It is an object of the present invention to advantageously employ these coupling variations.

FIG. 5 illustrates major functional components of an exemplary passive RF transponder 500 (compare 200) of the present invention. In a manner similar to that described with respect to the transponder 200, an antenna 502 (compare 202), such as a coil antenna, receives a carrier signal from the interrogator 108 (via antennas 110a . . . 110d). The carrier signal, of frequency F, is rectified by a rectifier circuit 504 (compare 204) to generate operating power. Clock and control logic circuitry 506 (compare 206) and sensor interface and data generation circuitry 508 (compare 208) are provided. Data derived from one or more condition sensor(s) 510 (compare 210) is optionally stored in memory 512 (compare 212), and is impressed on the antenna 502 by a modulator circuit 514 (compare 214) for transmission back to the interrogator 108.

The passive RF transponder 500 of the present invention also includes a power monitoring circuit 520 capable of monitoring the magnitude and/or phase of the signal on the antenna 502, preferably prior to rectification and regulation.

For detecting (sensing) fluctuations in the magnitude of the signal received by the transponder antenna 502, the power monitoring circuit 520 is suitably a combination of an envelope detector and threshold detector, such as is disclosed in U.S. Pat. No. 4,285,236, incorporated in its entirety by reference herein. In this manner, fluctuations in the signal powering the transponder can be detected. Attention is also directed to circuitry for monitoring a change in voltage across a coil which is proportional to peak-to-peak variations in power consumption and power output, as is disclosed in U.S. Pat. No. 5,559,507, incorporated in its entirety by reference herein.

In light of the teachings set forth herein, one having ordinary skill in the art to which the present invention most nearly pertains will recognize that it is relatively straightforward to detect "events" such as maximums, minimums, and null points in a signal being monitored, and to develop information regarding the duration or spacing of the events. For example, a time interval between a series of events can be determined by counting clock pulses, and information regarding the time interval can be imposed on a signal for transmission, such as by converting a count to a binary number, and modulating an RF transmission. The time or angular units between such "events" can be used to detect torsional effects about one or more of the tire axes. In this context, for example, the change in angular spacing or time between "events" could indicate a change in torsion acting about the tire's lateral axis of rotation.

Incorporating a Coupling Element

As mentioned above, it is generally desirable to ensure uniform, or at least adequate coupling of RF signals between an on-board interrogator and a tire-mounted transponder, irrespective of the orientation of the wheel or wheel carrier vis-a-vis the vehicle-mounted antenna. Similarly, when using a handheld device to read (including optionally powering) a tire-mounted transponder, effective coupling irrespective of tire orientation, sometimes referred to as "360 degree readability" is generally desirable. In a worst-case scenario, the orientation of a tire relative to a vehicle-mounted antenna could produce a "brownout" condition during a portion of the tire's revolution. The aforementioned U.S. Pat. No. 5,319,354 proposes an antenna construction to ameliorate this "problem". The aforementioned, commonly-owned U.S. Pat. Nos. 5,181,975 and 5,218,861, address improving coupling to a tire-mounted transponder, and disclose an annular bead (HOOP) of the tire acting as the primary winding of a transformer. A transponder is disposed near the HOOP and has a coil antenna that is loosely coupled to the HOOP and is the secondary winding of the transformer.

FIGS. 6A, 6B and 6C illustrate an RF transponder system 600 (compare 300) comprising a passive transponder 602 (compare 302) disposed within a pneumatic tire 604 (compare 304). The transponder system 600 is similar to the previously-described transponder system 300, in the following respects. A transponder 602 is mounted in any suitable manner to an inner surface 606 (compare 306) of the tire 604. An antenna 620 (compare 320) is disposed on the vehicle, adjacent the tire 604, such as in a wheel well of the vehicle directly next to the tire 604. The antenna 620 provides electromagnetic radiation for powering the transponder 602, and receives signals from the transponder 602. This embodiment of a transponder system 600 incorporates a hoop 630 extending circumferentially around the inner surface 606 of the tire 604. The hoop 630 is an electrically-conductive member which may function as a primary winding of a coupling transformer, with a coil antenna of the transponder functioning as a secondary winding of the coupling transformer, as described in the aforementioned U.S. Pat. Nos. 5,181,975 and 5,218,861. Generally, the hoop 630 beneficially affects (enhances) coupling between the transponder 602 and the external antenna 620 and, in this regard, can be considered to be a "coupling element". The hoop 630 is suitably a single turn of wire having its ends connected (shorted) to one another, but may comprise multiple turns or layers of wire or conductive material. The hoop 630 should have a low electrical resistance, preferably less than 10 ohms. The inclusion of a hoop enhances the "360-degree" readability of the transponder 602.

Regarding the actual location of the hoop 630, it should be understood that the hoop 630 is illustrated extending circumferentially around the inner surface 606 of the tire 604, slightly offset from the equatorial plane (EP) of the tire 604, for illustrative purposes only. It is within the scope of the invention, that the hoop 630 may be disposed on the axial centerline (equatorial plane) of the tire 604, passing directly underneath the transponder 602, and may also be "buried" in the body of the tire 604.

Regarding the hoop 630 itself, it should be understood that the hoop is an exemplary complete, endless, short-circuit loop of any electrically-conductive material suitable to function as a coupling element. The hoop 630 is suitably brass-plated high-tensile strength steel which exhibits good mechanical strength and resistance to corrosion when placed in the environment of an interior of a pneumatic tire. The hoop 630 may comprise multiple strands of such wire, which optionally may be plated (e.g., with nickel or gold).

It is within the scope of the invention that the hoop 630 element may be formed as two or more lengths of wire joined, in any suitable manner (such as by wrapping or soldering) at their ends to form a complete hoop extending around the entire circumference of the tire 604, or may be formed as a loop having two ends, or as an elongate conductor extending partially around a circumference of the tire, including on or in the sidewall thereof, including a loop having a coupling coil incorporated therein. It is further within the scope of the invention that the hoop 630 element may be formed as to multiple layers of tire cord material encased within conductive rubber.

In addition to its electrical characteristics as a coupling element, if the hoop is suitably rigid, it may serve the additional purpose of enhancing the run-flat qualities (e.g., deflated radial rigidity) of the tire.

As illustrated in FIGS. 6A, 6B and 6C, the vehicle antenna 620 is fixedly disposed at the "12 O'clock" orientation with respect to the tire 604, such as abreast of a top portion of the tire. It should be understood that the antenna 620 may be disposed at any position suitable for coupling electromagnetically with the transponder 602 without interfering with movement (e.g., rotation, steering, rebounding) of the tire 604.

In a manner similar to that described hereinabove, as the tire 604 rotates (as indicated by the arrow 632), the transponder 602 will be alternately nearer to (as in FIG. 6C) and farther from (as in FIG. 6B) the antenna 620. Hence, "direct" coupling between the antenna 620 and the transponder 602 will vary cyclically.

In addition to the direct coupling between the transponder 602 and the antenna 620, the hoop 630 "indirectly" couples energy between the transponder 602 and the antenna 620. This indirect electromagnetic coupling, between transponder-to-hoop-to-antenna remains relatively constant, because both the distance between hoop and antenna and the distance between hoop and transponder stay the same, even as the distance between transponder and antenna vary cyclically.

The tire bead in U.S. Pat. No. 5,181,975 serves a similar purpose to hoop 630, but may suffer from its proximity to a metal tire rim. The present invention addresses this situation by locating the hoop as far as practical from the rim.

FIG. 7 is a graph 700 (compare 400) illustrating fluctuations in the coupling of RF energy between an antenna (e.g., 620) of an on-board interrogator (e.g., 108) and a transponder (e.g., 602) disposed within a pneumatic tire, such as has been described hereinabove. The x-axis is the angle (in degrees) between the transponder 602 and the vehicle antenna 620 as the tire rotates. Zero degrees is where the transponder 602 is closest to the antenna 620, and 180 degrees is where the transponder 602 is farthest from antenna 620. The y-axis is coupling magnitude/phase, in arbitrary units.

As will become evident, the coupling varies in both magnitude and phase, as indicated by the line 702. A number of points 704, 706, 708, 710, 712, 714, 716 and 718 are indicated on the line to aid in the following description of coupling (power) fluctuation.

The transponder 602 and the interrogator antenna 620 are "indirectly" coupled by the hoop 630, and this indirect coupling is relatively constant over the entire revolution of the tire (between 0-degrees and 360-degrees). But when the transponder 602 gets close to the antenna 620, they become "directly" coupled with one another. This direct coupling is stronger than the indirect coupling, and is of opposite phase. The following can be observed.

Between 0-degrees (point 704) and approximately 270-degrees (point 706), coupling of energy to the transponder 602 is indirect and relatively constant—for example, of magnitude "A" with a "+" phase.

At approximately 270-degrees (point 706), direct coupling starts to manifest itself and, being of opposite phase to the indirect coupling, to cancel out the indirect coupling. At approximately 280-degrees (point 708), there is a "zero crossing" or "null dip" in the signal being received by the transponder as it transits from "+" phase to "−" phase.

As the tire continues to rotate, the magnitude of the signal being received by the transponder increases to a magnitude of 2 A at approximately 290-degrees (point 710).

Between approximately 290-degrees (point 710) and approximately 330-degrees (point 712), the magnitude of the signal is relatively constant at a magnitude/phase of −2 A.

At approximately 330-degrees (point 712), the direct coupling starts to fade, and power decreases. At approximately 340-degrees (point 714), there is another "zero crossing" or "null dip" in the signal being received by the transponder as it transits from "−" phase to "30 " phase.

As the tire continues to rotate, the magnitude of the signal being received by the transponder increases to a magnitude of A at approximately 350-degrees (point 716). Between approximately 350-degrees (point 717) and 360-degrees (point 718), the magnitude of the signal is relatively constant at a magnitude/phase of +A. (The point 718 is equivalent to the point 704.)

The points 708 and 714 represent "zero crossings" or "null dips", and are readily sensed by a power monitor circuit (e.g., 520) within the transponder. It is therefore, for example, a relatively straightforward matter to count clock pulses (e.g., with clock and control logic 506) during an interval 720 between the two zero crossings 708 and 714, and to store a count in a register or other suitable memory element (e.g., 512) for transmission in a digital data stream to an on-board interrogator (e.g., 108). The duration of the interval 720 will be representative of the rotational velocity of the tire—the shorter the interval, the fewer number of clock pulses counted during the interval, and the greater the rotational velocity of the tire. A typical tire on a typical passenger vehicle traveling at 60 mph (100 kph) will make one complete revolution in approximately 60 milliseconds (ms). The phase shifts occurring at the points 708 and 714 are suitably detected by circuitry such as is disclosed in U.S. Pat. No. 5,764,138, incorporated in its entirety by reference herein.

It should be understood that since the zero crossings (708, 714) imply that, at certain tire orientations no power is being coupled to the transponder 602, the transponder power supply (e.g., rectifier 504) should have some storage element such as a capacitor incorporated therein. In a similar manner, even if power is available to get "over the hump" (past the zero crossings), any signal being transmitted by the transponder to the on-board interrogator will also be subject to blackouts at certain tire positions.

Sensing Fluctuations at the Interrogator

As described hereinabove, certain problems can accompany sensing power (coupling) fluctuations at the transponder. There is now described a technique for sensing power fluctuations at the on-board interrogator.

FIG. 8 illustrates a tire pressure monitoring system 800, comparable to that described with respect to FIG. 1, in that a transponder ("TAG") 806*a* . . . 806*d* (compare 106*a* . . . 106*d*) is disposed within each of the tires 804*a* . . . 804*d* (compare 104*a* . . . 104*d*), respectively, of a motor vehicle 802 (compare 102). An on-board interrogator 808 (compare 108) comprises an RF transmitter 812 (compare 112), an RF receiver 814 (compare 114), control logic 816 (compare 116), and a display device 818 (compare 118). One or more antennas ("ANT") 810*a* . . . 810*d* (compare 110*a* . . . 110*d*), such as ferrite loopstick antennas, are disposed on the vehicle 802.

In this example, the on-board interrogator 808 is provided with a power monitoring circuit 820, comparable to the power monitor 520 of the transponder 500, to detect (sense) fluctuations in the coupling of an RF signal being transmitted by a tire-transponder to the on-board interrogator. Monitoring power fluctuations at the interrogator, rather than at the transponder, allows for the use of a simple prior art transponder (e.g., 200). It also allows for the use of an active (e.g., battery-powered) transponder (e.g., monitor 157), or a simple transmitter rather than a transponder. If the transponder is not required to be powered by the interrogator, the interrogator could simply be a receiver (e.g., 161, 166).

Finer Increments, ETC.

As described hereinabove, it is possible to monitor certain events (discernable/measurable coupling fluctuations such as null points 708 and 714) and determine elapsed time during an interval (e.g., 720) between the two events. In this manner, it is possible to determine the angular velocity of the tire, rotation-by-rotation. Evidently, acceleration can also be determined in a straightforward manner by the change in velocity, and the rate of change of acceleration also can be obtained where the further derivative of angular position is desirable, as, for example, in a mechanism for the electronic control of an antiskid brake system.

The tire's angular position can also be determined. In the example set forth above, the null points 708 and 714 occur at tire angular positions of 280 degrees and 340 degrees, respectively. It is evident that the uneven spacing of the null points is beneficial in determining which null point is which. (With the tire rotating, a pattern of "blips" would be discernable, as follows: "blip, blip, pause, blip, blip, pause . . . ".) If the null points 708 and 714 occurred 180 degrees apart, phase reversal would have to be tracked in order to determine which null point is which.

Blips are generally defined as a change in signal character detectable by the receiver and are typically a brief sinusoidal or unidirectional magnitude change in the received signal during the course of relative rotation between the receiver and the transmitter. For example many of the cited references describe pulse generators using passive, reactive electrical components for detecting specific points (discernable fluctuations) in the signal powering (alternatively, in the signal coming from) the transponder are indicative of known discrete angular positions of the tire, which may change as a function of torsional effects in the tire. For example, every 180 degrees of tire rotation a 'blip' or other signal feature is detected (e.g., a maximum and minimum as discussed with respect to FIG. 4). The time interval between these 'blips' can be determined (such as by counting clock pulses occurring in the transponder in the period between 'blips'). This time interval then can be used to divide the next time interval predictively into a fixed number of discrete intervals, for example, 256, each of which would then represent 1/256 (one-two-hundred-fifty-sixth) of 180 degrees, or, about 0.704 degrees of tire rotation. In other words, the time period between 'blips' every 180 degrees is assumed to remain relatively constant for the time period between the last 'blip' and the next. This assumed or predicted period is divided into equal intervals of time based on the transponder's clock frequency, but because little actual time change can occur between 'blips in only one half revolution of the tire, regardless of its acceleration, the exemplified 256 pulses or intervals of time actually represent uniform intervals of tire angular rotation. If the 'blips' are not evenly-spaced, yet their positions are known (see, e.g., FIG. 7), angular positions between discernable coupling fluctuations can also be determined in a similar manner.

Because the tire 104, 604 is flexible in all directions, and therefore flexibly coupled to the rigid wheel 172 and axle 170 of the vehicle 102, 152, it can be seen that torsion on the tire 104, 604 relative to the axle/wheel 170/172 (such as during braking or driving of the wheel) can cause at least momentary changes in the angular position of the outer circumference of the tire 104, 604 (e.g., the tire tread which contacts a road surface) relative to the axle/wheel 170/172, most especially while the torsion is changing (i.e., during braking or during acceleration and deceleration of a driven wheel). This torsional effect will produce a shift in the blip occurrences relative to a reference point on the wheel on which the tire 604 is mounted. The torsional effect is generally small in magnitude and also momentary in nature unless the tire 104, 604 actually happens to slip around the wheel.—an occurrence which is generally prevented by tire and wheel rim design and by fitment. Utilizing an embodiment of the invention to be discussed hereinbelow, rather than producing error, the torsional effect shift is detected and measured in order to gain further information about factors such as torsion on the tire and deflection of the tire.

In an embodiment of the invention, finer increments of angular position can be determined by interpolating between the aforementioned few discernable coupling fluctuations. This reasonably presumes that the rotational velocity of the tire will be fairly constant throughout a given revolution. One having ordinary skill in the art to which the present invention most nearly pertains will appreciate how to implement interpolation, in either software or hardware, in light of the teachings set forth herein. An example of a hardware interpolation technique is disclosed in the aforementioned U.S. Pat. No. 3,832,640.

In an alternate embodiment of the invention, finer increments of angular position can be determined by increasing the number of discernable coupling fluctuations (events) that are sensed per tire revolution.

FIG. 9 is similar to FIG. 6A, and illustrates a transponder 902 (compare 602) disposed on an inside surface of a tire 904 (shown in dashed lines, compare 604), and a coupling element hoop 930 (compare 630) within the tire. An antenna 920 (compare 620) for an on-board interrogator (not shown, compare 108) is illustrated. The antenna 920 is shown adjacent the "12 O'clock" position of the tire 904, and the transponder 902 is shown at the 0 degree orientation of the tire.

In this embodiment of the invention, a plurality of reactive circuit affecting elements can be incorporated into the hoop at various points around the hoop's circumference. The elements typically include inductive elements, capacitive elements, or magnetic elements. Each of the reactive circuit affecting elements react in a different manner but all will cause fluctuations in the coupling that are indicative of a particular orientation of the tire. For example, two discs having magnetic or capacitive elements at various points about the circumference of the discs, can be rotated with respect to each other so that the electric fields generated by each are coupled and cause field fluctuations that can be measured for ascertaining a particular orientation of the tire. The plurality of reactive circuit affecting elements typically include inductive elements 910, 912 and 914 that are shown incorporated into the hoop at various points about the hoop's circumference. Such inductive elements may be ferrite rings or steel protrusions, or merely widening or narrowing of the hoop itself. These inductive elements will cause fluctuations ("blips") in the RF coupling as each inductive element passes the antenna 920. As illustrated, the inductive elements 910, 912 and 914 are not evenly-spaced about the circumference of the hoop 930. Rather, the element 910 is disposed at zero degrees, the element 912 is disposed at 90 degrees, and the element 914 is disposed at 270 degrees. (The transponder 902 is disposed at 180 degrees.) With the tire rotating, a pattern of "blips" will be discernable, as follows: "blip, blip, pause, blip". This uneven spacing of the inductive elements, and consequent uneven blip-spacing, can be advantageous for ascertaining a particular orientation of the tire, rather than merely its rotational velocity. It is within the scope of the invention that inductive elements for causing discernable coupling fluctuations can be incorporated into the tire, about the circumference of the tire, without there being a hoop, including with or without there being an "antenna" coupling element, as described hereinbelow.

FIG. 9A is a graph 950 (compare 400) illustrating fluctuations in the coupling of RF energy between the antenna 920 and the transponder 902. The x-axis is the angle (in degrees) between the transponder 902 and the vehicle antenna 920 as the tire rotates. 0 degrees is where the transponder 902 is closest to the antenna 920, and 180 degrees is where the transponder 902 is farthest from antenna 920. The y-axis is coupling magnitude, in arbitrary units. Generally, the coupling varies cyclically, due to the tire rotation, and varies in some manner, as illustrated by the line 952 where the variation is magnified for illustrative purposes. In this figure, the "blips" 960, 962 and 964 caused by the inductive elements 910, 912 and 914, respectively, are illustrated.

Alternate Embodiments

Various embodiments have been described hereinabove wherein a hoop (e.g., 630) is disposed in a tire (e.g., 604), along with a transponder (e.g., 602) to provide for 360-degree readability. In those embodiments, the transponder is inductively coupled to the hoop, as described in the aforementioned U.S. Pat. Nos. 5,181,975 and 5,218,861.

In an alternate embodiment of the invention, a nearly complete circle of wire (or other suitable electrically-conductive material) would be disposed in the tire in lieu of the completely-circular hoop. The nearly complete circle of wire would have two ends, and a coupling coil attached between the two ends, and would be a "loop antenna". A transponder having an internal antenna in the form of a coupling coil would be disposed closely adjacent the coupling coil of the loop antenna so as to effect transformer-type coupling between the two coupling coils. An advantage of this would be that coil-to-coil coupling will tend to be stronger than loop-to-coil coupling. In yet another embodiment of the invention, a loop antenna (a nearly complete circle of wire) could be directly connected ("hard-wired") to the transponder. In either case (coupling coil or direct connection), the loop antenna functions as a coupling element in much the same manner as the aforementioned hoop(s).

An Exemplary System

FIG. 10 shows an embodiment of a condition monitoring and control system 1000, installed on a vehicle 1002 (shown in dashed lines), such as a typical passenger vehicle having four pneumatic tires 1004a, 1004b, 1004c and 1004d installed on four respective wheels (not shown).

The vehicle 1002 is preferably equipped with an RS-485 (or equivalent) multiplexed serial data bus 1006 controlled by an on-board vehicle computer 1008 having an RS-485 interface 1010. Preferably, a central display unit 1012 is connected either directly to the computer 1008 or is operatively connected (as shown) to the computer 1008 via the data bus 1006. The data bus 1006 is suitably a twisted pair of insulated wires (labeled "A" and "B"), preferably with a minimum of one twist per inch.

It is within the scope of the invention that if no data bus is provided on the vehicle, one can be added thereto. For example, in the absence of an existing vehicle data bus, a dedicated data bus may be provided, such as a bi-directional data bus conforming to RS-485 or other suitable serial communications standards.

Each of the four tires 1004a . . . 1004d is equipped with an electronic module ("TAG") 1020a . . . 1020d, respectively, and associated sensor (not shown, well known) capable of monitoring one or more conditions such as air pressure and air temperature within the tire, and of transmitting a radio frequency (RF) signal indicative of (e.g., modulated as a function of) the monitored condition(s) within the respective vehicle tire. The tags 1020a . . . 1020d are suitably transponders, but may alternatively simply comprise one or more condition sensors and a radio frequency transmitter, as described hereinabove.

The system 1000 comprises four monitors (or "interrogation units") 1030a . . . 1030d, each associated with a respective one of the tires 1004a . . . 1004d and preferably located in proximity therewith, such as mounted within the wheel wells of the vehicle.

Each monitor 1030a . . . 1030d is connected to a source of power (as indicated by the lines terminating in circles and triangles) and is connected to the multiplexed serial data bus 1006 for individually communicating with the on-board computer 1008.

Each monitor 1030a . . . 1030d is generally comparable to any of the interrogators (e.g., 108, 808) described hereinabove. Each monitor 1030a . . . 1030d comprises an antenna 1032a . . . 1032d (compare 110a . . . 110d, 810a . . . 810d), respectively, a receiver (not shown, compare 114, 814) for receiving transmissions from the tag, and a transmitter (not shown, compare 112, 812) for transmitting to (and optionally powering) a respective one of the tags 1020a . . . 1020d. In the case of coupling fluctuations being sensed at the interrogation unit, rather than at the transponder, each monitor 1030a . . . 1030d is provided with a suitable power monitor 1034a . . . 1034d (compare 820), respectively.

Each monitor 1030a . . . 1030d comprises a suitable data transceiver (such as the DS36277 Dominant Mode Multipoint Transceiver by National Semiconductor) to facilitate two-way data transmission via the data bus 1006.

A monitor's transmissions to the respective tag may comprise a carrier signal for energizing a passive tag, and may comprise signals to "wake up" an active tag which is in a low-power sleep mode. It is within the scope of the invention that all components of the monitor (1030), including the antenna (1032) can be encapsulated in a single package. Alternatively, the antenna (1032) can be disposed outside of such a package.

Monitored condition information carried by the RF signals from the respective tags 1020a . . . 1020d can be decoded (e.g., demodulated) and provided to the on-board computer 1008 for subsequent display (1012) to the operator of the vehicle. It is within the scope of the invention that suitable discernable visual and/or audible warnings can be used at the option of the vehicle manufacturer. Additionally, the information regarding dynamic conditions of the tires can be utilized in controlling the vehicle, such as by providing relevant inputs to a "smart" suspension system.

Dynamic conditions of a pneumatic tire in addition to tire angular position, such as rotational velocity, acceleration and rate of change acceleration, lateral acceleration, radial runout, torsional effects about one or more of the tire axes, steering angle and the like will also cause discernable coupling (power) fluctuations.

The power level to the transponder can be analyzed from a frequency standpoint to obtain dynamic data. Fourier analysis of the waveform will produce data containing harmonics of the base frequency. This data can be used to control suspension, steering or other frequency related characteristics of discrete vehicle systems. The vibration characteristic of these vehicle systems determine handling, subjective "feel" of the vehicle and noise, both interior and exterior. Control of these frequency related characteristics within the various vehicle systems can be used on a dynamic basis to control harmonic amplitudes, resonances and aesthetic parameters. For example, the transponder signal or power levels can be used in conjunction with a vehicle sound frequency generator (speaker) to provide active noise cancellation in response to harmonic amplitude analysis.

Measuring Tire/Wheel Relative Effects

As mentioned hereinabove, torsional effects produce movement (generally momentary) of the tire (especially the tire outer circumference or tread region) relative to the wheel or wheel carrier upon which the tire is mounted due to the flexible nature of the tire. An embodiment of the invention will now be discussed wherein such relative movement is detected and measured in order to determine additional tire operating condition information such as, for example, torsion on the tire, tangential deflection of the tire (especially at it's outer circumference), and even slippage of the tire on the wheel rim.

FIG. 15 illustrates a condition monitoring system 1550 which comprises certain features of tire monitoring systems such as the systems 100, 800, and 1000 (see FIGS. 1, 8, and 10) combined with certain features of a wheel or wheel carrier monitoring system such as the system 150 of FIG. 1A. The system 1550 is installed on a vehicle 1552 (shown in dashed lines), such as a typical passenger vehicle having four pneumatic tires 1504 (1504a, 1504b, 1504c and 1504d) installed on four respective wheels (not shown) to form four respective tire/wheel assemblies 1505a . . . 1505d. Each of the four tires 1504 is equipped with a first electronic module (tire transponder) 1506 (1506a, 1506b, 1506c and 1506d), capable of transmitting an RF tire signal by means of an associated antenna (not shown). The tire transponder 1506 may additionally include the capabilities of transponders or TAGs such as the transponders 106, 200, 302, 602, 806, 902, and 1400, such capabilities including, for example, monitoring (by means of associated sensors) one or more conditions such as air pressure and air temperature within the tire 1504 and including data in the RF signal which is indicative of (e.g., modulated as a function of) the monitored condition(s), as described hereinabove. Mounted on the wheel or wheel carrier associated with each tire 1504 is a is second electronic module (wheel or wheel carrier transponder) 1557 (1557*a*, 1557*b*, 1557*c* and 1557*d*), capable of transmitting an RF wheel or wheel carrier signal by means of an associated antenna (not shown). The wheel or wheel carrier transponder 1557 is enclosed in a protective housing 1556 (1556*a*, 1556*b*, 1556*c* and 1556*d*) which may also incorporate the capabilities of a tire monitoring and regulating device such as the device 156 (see FIGS. 1A and 1B) which monitors and/or regulates the pressure of the air in the tire 104, 1504.

Mounted on the vehicle 1552 (on-board) is a receiver 1566 (compare 166, 114/112/116, 814/820/812/816) having associated antennas 1510, 1560 (compare 110, 160, 620, 810, 920, 1032), and an optional display 1562 (compare 118, 162, 818, 1012). A separate wheel or wheel carrier receiving antenna 1560*a* . . . 1560*d* is fixedly mounted on the vehicle in close proximity to a corresponding wheel or wheel carrier transponder 1557*a* . . . 1557*d* (e.g., mounted on each axle housing of the vehicle 1552 close to the wheel hub), and is suitably, for example, a loopstick antenna. A separate tire receiving antenna 1510*a* . . . 1510*d* is fixedly mounted on the vehicle in close proximity (adjacent) to a corresponding tire transponder 1506*a* . . . 1506*d* (e.g., mounted in each wheel well of the vehicle 1552), and is suitably, for example, a loopstick antenna. Optionally associated with the receiving antennas 1560 and/or 1510 are sub-receivers 1561 and/or 1571 such as are described hereinabove with reference to the distributed receiving system sub-receivers 161 illustrated in FIG. 1A. Alternatively, the sub-receivers 1561 and/or 1571 could be similar to the monitors 1030 described hereinabove with reference to the distributed receiving system illustrated in FIG. 10; an arrangement which would facilitate the use of passive transponders in the tire 1504 and/or its associated wheel or wheel carrier.

The receiver 1566, optionally in conjunction with sub-receivers 1561 and/or 1571, comprises one or more microcontrollers (e.g., U15 in FIG. 13) capable of performing data manipulations such as the pressure/temperature calculations and revolution counting of the receiver 1366; plus suitable power monitoring functions (compare power monitors 820, 1034) for determining angular position of each tire 1504 and of the wheel or wheel carrier associated with each tire 1504; plus one or more microprocessors (compare 816, 1008, U15) capable of comparing relative tire and wheel or wheel carrier angular positions to determine torsional effects and output appropriate display information and data. Alternatively, the power monitoring capability may be included in the tire transponder 1506 and the wheel or wheel carrier transponder 1557 (e.g., 520), and/or other means of angular position encoding may be employed (e.g., an ABS system), and the receiver(s) 1566, 1561, 1571 may not need to perform power monitoring.

FIGS. 16A and 16B illustrate, in side and in cross-sectional views, respectively, a preferred embodiment 1600 of the tire/wheel or wheel carrier assembly 1505 portion of the condition monitoring system 1550, with an exemplary tire transponder 1602 (compare 1506) and a exemplary wheel or wheel carrier transponder 1657 (compare 1557).

The tire transponder 1602 is, for example, a transponder (e.g., 602, 902) mounted in any suitable manner to an inner surface 1606 (compare 606) of the tire 1604, preferably as close to the radially outermost circumference of the tire 1604 as is practical. For the antenna associated with the tire transponder 1602, this embodiment of a transponder system 1600 incorporates a hoop 1630 (compare 930) extending circumferentially around the inner surface 1606 of the tire 1604. The hoop 1630 is an electrically-conductive member which may function as a primary winding of a coupling transformer, with a coil antenna (not shown) of the transponder 1602 functioning as a secondary winding of the coupling transformer, as described hereinabove. The hoop antenna 1630 is essentially equivalent in design and function to the hoop antenna 930 described hereinabove with reference to FIG. 9, and as such features a plurality of inductive elements 1614 (compare 910, 912, 914) which are incorporated into the hoop at various points about the hoop's circumference. Such inductive elements 1614 may be ferrite rings or steel protrusions, or merely widening or narrowing of the hoop 1630 itself. These inductive elements 1614 will cause fluctuations ("blips") in the RF coupling between the antenna 1630 and a tire receiving antenna 1610 (compare 1510) as each inductive element 1614 passes the tire receiving antenna 1610. Although only three of the plurality of inductive elements 1614 (1614*a*, 1614*b*, 1614*c*) are illustrated, there may be many more inductive elements 1614 regularly spaced around the antenna 1630 as needed to provide sufficient resolution in the indication of tire angular position. It is within the scope of this invention that inductive elements for causing discernable coupling fluctuations can be incorporated into the tire 1604, about the circumference of the tire, without there being a hoop 1630. Alternatively, the antenna 1630 with inductive elements 1614 may be directly connected to the transponder 1602 as the only antenna associated with the transponder 1602, and the antenna 1630 may be other than an endless hoop; for example, the antenna 1630 may be a dipole antenna extending in two directions around the circumference of the tire 1604 (i.e., a circular dipole antenna). By utilizing the latter alternative embodiment, a regularly spaced pattern of blips (e.g., 962, 960, 964) could be achieved without encountering the overall variation in coupling magnitude (e.g., curve 952) which is caused by a separate rotating antenna located on the transponder 902, 1602.

The wheel or wheel carrier transponder 1657 is, for example, a transponder (e.g., 1400) mounted on the wheel or wheel carrier 1672, preferably in a protective housing 1680 which is held in place by wheel mounting nuts 1674 (compare 174). Optionally, the wheel or wheel carrier transponder 1657 may be incorporated (e.g., 188) in a tire monitoring and regulating device 1656 (compare 156). For the antenna associated with the wheel or wheel carrier transponder 1657, this embodiment of a transponder system 1600 incorporates a circular dipole antenna 1650 which is shown attached to the wheel or wheel carrier 1672 in a convenient location. Although shown as mounted on the axially outward side of the wheel 1672, it should be understood that the antenna 1650 could be mounted anywhere on the wheel 1672, including on the axially inward side of the wheel 1672. An antenna wire 1692 (compare 192) connects the wheel or wheel carrier antenna 1650 to the wheel or wheel carrier transponder 1657. Alternative embodiments include, for example, etching the antenna onto a circuit board associated with the wheel or wheel carrier transponder (e.g., 185); or, for example, terminating the antenna wire 1692 in a small coupling coil adjacent to the antenna 1650 which is formed as an endless hoop similar to the hoop tire antenna 1630 described hereinabove. Regardless of its form and placement, the wheel or wheel carrier antenna 1650 preferably incorporates a plurality of inductive elements 1612 similar to the inductive elements 1614 described hereinabove for the tire antenna 1630. These inductive elements 1612 will cause fluctuations ("blips") in the RF coupling between the antenna 1650 and a wheel or wheel carrier receiving antenna 1660 (compare 1560) as each inductive element 1612 passes the tire receiving antenna 1660. Although only four of the plurality of inductive elements 1612 (1612a, 1612b, 1612c, 1612d) are illustrated, there may be many more inductive elements 1612 regularly spaced around the antenna 1650 as needed to provide sufficient resolution in the indication of wheel or wheel carrier angular position.

It should be noted that the embodiment illustrated in FIGS. 16A and 16B incorporates simpler embodiments which should also be considered within the scope of the present invention. In particular, for example, the wheel or wheel carrier mounted elements (e.g., 1657, 1680, 1612, 1692, 1656, 1650) and the corresponding wheel or wheel carrier receiving antenna 1660 could be part of a system such as system 150 illustrated in FIG. 1A, wherein the system 150 is used for monitoring conditions such as wheel or wheel carrier rotation.

Alternative embodiments of the condition monitoring system 1550 include the use of tire transponders 1506, 1602 which transmit at a specific frequency which is identifiably different from the specific frequency at which the wheel or wheel carrier transponders 1557, 1657 transmit. With such a system it would be possible to receive the signals from both wheel or wheel carrier and tire transponders using a single receiving antenna 1510, 1560, 1610, 1660 mounted in close proximity to each tire/wheel assembly 1505.

In another alternative embodiment, the rotational angular position encoding for each wheel or wheel carrier is determined through use of a vehicle ABS system, or through use of the pump pendulum 184 with a star or toothed wheel or other encoding techniques as described hereinabove. These techniques would also allow for a simplified system with, for example, a single centralized antenna 1560 for receiving transmissions from all wheel or wheel carrier transponders 1557, 1657.

With the system 1550, it is possible to monitor the rotational angular position of a tire 1604 relative to its wheel or wheel carrier 1672, and therefore to determine a variety of torsional effects which impact the operating conditions and performance of the tire/wheel assembly 1505.

Concluding Comments

There have thus been described methods and apparatus for monitoring a dynamic condition of a rotary element such as a pneumatic tire. Generally, the magnitude and/or phase of RF energy coupled between a vehicle antenna and a tire-mounted or a wheel-mounted transponder is monitored, and fluctuations utilized as indicative of dynamic conditions of the tire and/or wheel. The use of circular dipole, hoop and loop antennas within the tire and on the wheel or wheel carrier has been described.

It is within the scope of the invention that circular dipole, hoops, loops and the like can be embedded in the carcass of the tire, rather than disposed on an inner surface thereof.

It is within the scope of the invention that hoops, loops and the like following a nonplanar "serpentine" path can be disposed on the inside surface of the tire (or embedded in the carcass of the tire).

It is within the scope of the invention that phenomena other than null points, dips, spikes and the like can be monitored as being indicative of dynamic tire conditions. For example, the average level of RF coupling may decrease as the tire is steered (turned laterally), thereby indicating the tire's steering angle.

It is within the scope of the invention that the vehicle receiving antenna can be disposed other than at approximately the 12 O'clock position with respect to the tire. For example, a vehicle antenna could be disposed at the 9 O'clock position with respect to the tire, in which case, steering (turning) the tire would affect signal coupling.

It is within the scope of the invention that transponders and antennas can be disposed in both the tire and the wheel or wheel carrier for the purpose of monitoring the rotational angular position (and various derivatives of angular position) of a tire relative to its wheel or wheel carrier, thereby indicating, for example, torsional effects on the tire.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A system for monitoring pneumatic tire conditions for one or more tire/wheel assemblies mounted on a vehicle, each tire/wheel assembly comprising a tire mounted on a wheel or wheel carrier, the system comprising:

a wheel or wheel carrier transponder with a wheel or wheel carrier antenna mounted on the wheel or wheel carrier of the one or more tire/wheel assemblies for transmitting a signal indicating the rotational angular position of the wheel or wheel carrier;

one or more receivers each having one or more receiving antennas fixedly mounted on the vehicle, the one or more receiving antennas being positioned to receive the signal from a specific one of the tire/wheel assemblies;

circuitry means for processing the signals received by the one or more receiving antennas and for determining the rotational angular position of the wheel or wheel carrier of the one or more tire/wheel assemblies; and at least one of the wheel or wheel carrier antennas being substantially circular and including a plurality of reactive elements incorporated into and spaced about the circumference of the at least one wheel or wheel carrier antenna for causing blips which are indicative of the rotational angular position of the wheel or wheel carrier antenna to occur in the signal received by the receiving antenna which is positioned to receive the signal from the at least one wheel or wheel carrier antenna, wherein the reactive elements comprise at least one of inductive elements, capacitive elements, or magnetic elements.

2. A system, according to claim 1, wherein:

at least one of the wheel or wheel carrier antennas is a conductive hoop coupled to the wheel or wheel carrier transponder; and each conductive hoop wheel or wheel carrier antenna includes a plurality of inductive elements incorporated into and spaced about the circumference of the conductive hoop wheel or wheel carrier antenna for causing blips which are indicative of the rotational angular position of the conductive hoop wheel or wheel carrier antenna to occur in the signal received by the receiving antenna which is positioned to receive the signal from the at least one wheel or wheel carrier antenna.

3. A system, according to claim 2, wherein the system comprises:

a pump system mounted on the wheel or wheel carrier for tire pressure regulation and a tire pressure sensor connected to the wheel or wheel carrier transponder for measuring the tire pressure.

4. A method for monitoring pneumatic tire conditions for one or more tire/wheel assemblies each comprising a tire mounted on a wheel or wheel carrier, the method comprising the step of:

comparing the rotational angular position of a tire to the rotational angular position of the wheel or wheel carrier in the tire's tire/wheel assembly in order to determine operating conditions of the tire.

5. A method, according to claim 4, comprising the step of:

further determining pneumatic tire conditions by monitoring one or more of a tire pressure, a tire temperature, and a count of tire revolutions.

6. A method, according to claim 4, comprising the step of:

measuring the rotational angular position of a radially outer portion of the tire by means of an RF signal transmitted by an antenna mounted inside the tire near the outer circumference of the tire.

7. A system for monitoring pneumatic tire conditions for one or more tire/wheel assemblies mounted on a vehicle, each tire/wheel assembly comprising a tire mounted on a wheel or wheel carrier, the system comprising:

a wheel or wheel carrier transponder with a wheel or wheel carrier antenna mounted on the wheel or wheel carrier of the one or more tire/wheel assemblies for transmitting a first signal indicating the rotational angular position of the wheel or wheel carrier;

a tire transponder with a tire antenna mounted on the tire of the one or more tire/wheel assemblies for transmitting a second signal indicating the rotational angular position of the tire;

one or more receivers each having one or more receiving antennas fixedly mounted on the vehicle, the one or more receiving antennas being positioned to receive the first signal and the second signal from a specific one of the tire/wheel assemblies;

circuitry means for processing the first and second signals received by the one or more receiving antennas and for determining the rotational angular position of the tire relative to the wheel or wheel carrier of the one or more tire/wheel assemblies; and at least one of the tire antennas being substantially circular and including a plurality of reactive elements incorporated into and spaced about the circumference of the at least one tire antenna for causing blips which are indicative of the rotational angular position of the tire antenna to occur in the second signal received by the receiving antenna which is positioned to receive the second signal from the at least one tire antenna, wherein the reactive elements comprise at least one of inductive elements, capacitive elements, or magnetic elements.

8. A system, according to claim 7, wherein:

the plurality of reactive elements are inductive elements in the at least one tire antenna; and the plurality of inductive elements are mounted near the outer circumference of the tire.

9. A system, according to claim 7, wherein:

at least one of the wheel or wheel carrier antennas is substantially circular and the plurality of reactive elements includes a plurality of inductive elements incorporated into and spaced about the circumference of the at least one wheel or wheel carrier antenna for causing blips which are indicative of the rotational angular position of the wheel or wheel carrier antenna to occur in the first signal received by the receiving antenna which is positioned to receive the first signal from the at least one wheel or wheel carrier antenna.

10. A system, according to claim 7, wherein:

at least one of the tire antennas is a conductive hoop coupled to the tire transponder; end each conductive hoop tire antenna includes a plurality of reactive elements incorporated into and spaced about the circumference of the conductive hoop tire antenna for causing blips which are indicative of the rotational angular position of the conductive hoop tire antenna to occur in the second signal received by the receiving antenna which is positioned to receive the second signal from the at least one tire antenna, wherein the reactive elements comprise at least one of inductive elements, capacitive elements, or magnetic elements.

11. A system, according to claim 10, wherein:

the at least one conductive hoop tire antenna which includes a plurality of reactive elements is mounted near the outer circumference of the tire.

12. A system, according to claim 7, wherein:

at least one of the wheel or wheel carrier antennas is a conductive hoop coupled to the wheel or wheel carrier transponder; and each conductive hoop wheel or wheel carrier antenna includes a plurality of inductive elements incorporated into and spaced about the circumference of the conductive hoop wheel or wheel carrier antenna for causing blips which are indicative of the rotational angular position of the conductive hoop wheel or wheel carrier antenna to occur in the first signal received by the receiving antenna which is positioned to receive the first signal from the at least one wheel or wheel carrier antenna.

13. A system, according to claim 7, wherein the system comprises:

a pump system mounted on the wheel or wheel carrier for tire pressure regulation and a tire pressure sensor connected to the wheel or wheel carrier transponder for measuring the tire pressure.

14. A system, according to claim 7, wherein the system comprises:

a tire pressure sensor connected to the tire transponder for measuring the tire pressure.

15. A system, according to claim 7, wherein:

there is one receiving antenna for each specific tire/wheel assembly; and each receiving antenna is configured to receive the first signal at a first frequency from the wheel or wheel carrier antenna of the specific tire/wheel assembly, and is configured to receive the second signal at a second frequency from the tire antenna of the specific tire/wheel assembly.

16. A system, according to claim 7, wherein:

there is a tire receiving antenna for each specific tire antenna, wherein the tire receiving antenna is positioned by fixedly mounting it on a wheel housing in close proximity to the tire antenna on the tire; and there is a wheel or wheel carrier receiving antenna for each specific wheel or wheel carrier antenna, wherein the wheel or wheel carrier receiving antenna is positioned by fixedly mounting it on an axle housing in close proximity to the wheel or wheel carrier antenna on the wheel.

17. A system, according to claim 7, wherein:

one or more of the tire transponders and of the wheel or wheel carrier transponders is a passive transponder; and the receiver and receiving antenna associated with each of the one or more passive transponder; and the receiver and receiving antenna associated with each of the one or more passive transponders transmit an interrogating signal to the associated passive transponder.

18. A method, according to claim 4, comprising the step of:

determining the derivatives of rotational angular position of the wheel including velocity, acceleration and rate of acceleration of the tire.

* * * * *